(12) United States Patent
Pribyl

(10) Patent No.: US 11,783,383 B2
(45) Date of Patent: *Oct. 10, 2023

(54) METHOD AND SYSTEM FOR PROVIDING ADVERTISING IN IMMERSIVE DIGITAL ENVIRONMENTS

(71) Applicant: Quintan Ian Pribyl, Round Rock, TX (US)

(72) Inventor: Quintan Ian Pribyl, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,780

(22) Filed: Nov. 30, 2021

(65) Prior Publication Data

US 2022/0092649 A1 Mar. 24, 2022

Related U.S. Application Data

(60) Division of application No. 16/833,229, filed on Mar. 27, 2020, now Pat. No. 11,216,853, which is a continuation-in-part of application No. 15/490,664, filed on Apr. 18, 2017, now abandoned, which is a
(Continued)

(51) Int. Cl.
| | |
|---|---|
| *G06Q 30/02* | (2023.01) |
| *G06Q 20/12* | (2012.01) |
| *G06T 19/00* | (2011.01) |
| *G06Q 30/0241* | (2023.01) |
| *G06Q 30/0251* | (2023.01) |
| *G06Q 50/00* | (2012.01) |

(52) U.S. Cl.
CPC ....... *G06Q 30/0277* (2013.01); *G06Q 20/123* (2013.01); *G06Q 30/0269* (2013.01); *G06Q 30/0276* (2013.01); *G06T 19/006* (2013.01); *G06Q 50/01* (2013.01); *G06T 2200/24* (2013.01)

(58) Field of Classification Search
CPC ......... G06Q 30/02; A63F 13/92; A63F 13/35; G06T 15/20; G06F 3/011
See application file for complete search history.

(56) References Cited

U.S. PATENT DOCUMENTS

| | | |
|---|---|---|
| 6,954,726 B2 | 10/2005 | Brandel |
| 10,217,135 B2 | 2/2019 | Brown et al. |
| 10,395,281 B2 | 8/2019 | Greif et al. |

(Continued)

*Primary Examiner* — Saba Dagnew
(74) *Attorney, Agent, or Firm* — HULSEY P.C.

(57) ABSTRACT

A method and system for advertising dynamic content in an immersive digital medium user experience operate a plurality of computer processors and databases in an associated network for receiving, processing, and communicate instructions and data relating to advertising content in an immersive digital medium user experience. The method and system execute instructions and processing data relating to advertising objects, the advertising objects comprising images of objects, signs, labels, and related indicia of object origin for indicating sources of purchasing one or more objects for advertising to receive advertising instructions and data from a plurality of software applications and further respond to variations in said advertising instructions and data whereby operation of said computer processors and databases enables swapping out of various advertising messages and images according to the context of said immersive digital medium user experience.

8 Claims, 14 Drawing Sheets

Related U.S. Application Data continuation-in-part of application No. 15/448,410, filed on Mar. 2, 2017, now abandoned.

(60) Provisional application No. 62/302,857, filed on Mar. 3, 2016.

(56) References Cited

U.S. PATENT DOCUMENTS

| | | |
|---|---|---|
| 2004/0031058 A1 | 2/2004 | Reisman |
| 2004/0104935 A1* | 6/2004 | Williamson ............ G06V 10/10 715/757 |
| 2006/0105841 A1* | 5/2006 | Rom ....................... A63F 13/35 463/42 |
| 2009/0070221 A1* | 3/2009 | Carmichael ............ G06Q 30/02 705/14.54 |
| 2009/0076894 A1 | 3/2009 | Bates |
| 2009/0106671 A1* | 4/2009 | Olson ..................... G06F 3/011 715/757 |
| 2009/0115776 A1 | 5/2009 | Bimbra |
| 2009/0263777 A1* | 10/2009 | Kohn ....................... G09B 7/00 434/350 |
| 2010/0036729 A1 | 2/2010 | Hamilton, II |
| 2013/0178257 A1 | 7/2013 | Langseth |
| 2013/0247083 A1 | 9/2013 | Impollonia |
| 2014/0063061 A1 | 3/2014 | Reitan |
| 2014/0125702 A1* | 5/2014 | Santillan ................ A63F 13/92 345/633 |
| 2015/0077416 A1 | 3/2015 | Villmer |

* cited by examiner

METHOD AND SYSTEM FOR PROVIDING ADVERTISING IN IMMERSIVE DIGITAL ENVIRONMENTS

RELATED APPLICATIONS

The present claims priority to U.S. Non-Provisional patent application Ser. Nos. 15/490,664 and 15/448,410 entitled "METHOD AND SYSTEM FOR PROVIDING ADVERTISING IN VIRTUAL REALITY AND AUGMENTED REALITY SOFTWARE APPLICATIONS", and U.S. Non-Provisional patent application Ser. No. 16/833,229 entitled "METHOD AND SYSTEM FOR PROVIDING ADVERTISING IN IMMERSIVE DIGITAL ENVIRONMENTS" by the inventor hereof and claiming priority to Provisional Application No. 62/302,857, filed on Mar. 3, 2016, and entitled "Methods to Deliver Advertising in Virtual Reality and Augmented Reality Software Applications," both applications being here expressly incorporated by reference in their entirety.

FIELD OF THE INVENTION

The present disclosure relates to information processing systems and, more particularly to a method and system for providing contextual communications and messages in immersive digital environments, including virtual reality and augmented reality digital environment. Additionally the present disclosure provides a method and system for providing advertising in a wide variety of immersive digital software applications capable of presenting a variety of sensory experiences.

BACKGROUND OF THE INVENTION

An immersive digital environment is an artificial, interactive, computer-created scene or "world" within which a user can immerse themselves. Immersive digital environments could be thought of as synonymous with virtual reality (VR) and/or augmented reality (AR), but without the implication that actual "reality" is being simulated. An immersive digital environment could be a model of reality, but it could also be a complete fantasy user interface or abstraction, as long as the user of the environment is immersed within it. The definition of immersion is wide and variable, but here it is assumed to mean simply that the user feels like they are part of the simulated "universe". The success with which an immersive digital environment can actually immerse the user is dependent on many factors such as believable 3D computer graphics, surround sound, interactive user-input and other factors such as simplicity, functionality and potential for enjoyment. New technologies are currently under development which claim to bring realistic environmental effects to the players' environment—effects like wind, seat vibration and ambient lighting.

To create a sense of full immersion, the 5 senses (sight, sound, touch, smell, taste) must perceive the digital environment to be physically real. Immersive technology can perceptually fool the senses through: (a) panoramic 3D displays (visual); (b) surround sound acoustics (auditory); (c) haptics and force feedback (tactile); (d) smell replication (olfactory); and (e) taste replication (gustation). Once the senses reach a sufficient belief that the digital environment is real (it is interaction and involvement which can never be real), the user must then be able to interact with the environment in a natural, intuitive manner. Various immersive technologies such as gestural controls, motion tracking, and computer vision respond to the user's actions and movements. Brain control interfaces (BCI) respond to the user's brainwave activity.

An advertisement, hereinafter also referred to as an "ad," is used to market and sell a product or service. Typical advertisements contain primary information in the form of text, images and/or audio information about a product or service. The primary information in the advertisement may also contain information, such as a toll-free 800 number, a website address, a physical street address, or another means of action, that provides a way for the viewer or listener to take an action to either buy the product or obtain more supplemental information related to the product. Magazine and video ads, roadside billboards, street-level ads, posters in the subway or bus stops, digital-out-of-home advertisements, kiosks, advertisements on vehicles such as taxis, buses, cars, and the like, contain similar information.

U.S. Pat. No. 10,217,135, entitled "Presenting an Advertisement in A Vehicle," describes technique for providing advertisement information in an online environment. The technique includes, in part sending, from a device built into a vehicle, a first set of data to a server, the first set of data corresponding to measurements performed by one or more sensors, receiving a first set of elements from the server in response to the first set of data, presenting one or more elements from the first set of elements to a user of the vehicle on a display in the vehicle, and receiving at least one input corresponding to at least one selected element among the one or more elements.

U.S. Pat. No. 10,395,281, entitled "Advertisement Selection and Pricing Based on Advertisement Type and Placement," describes another online system that selects advertisements for presentation in various advertisement slots to maximize the total value to the online system for advertisement presentation. Candidate advertisements for presentation to a user are identified and types of advertisements are associated with various advertisement slots. For example, types of advertisements are associated with advertisement slots based on values for presenting various types of advertisements in different advertisement slots and one or more ad placement rules. Candidate advertisements having an advertisement type associated with each advertisement slot are identified, and an expected value of various placements of the candidate advertisements having a type corresponding to advertisement slots is determined. Based on the expected values, a placement of candidate advertisements in advertisement slots is selected and presented to a user.

To date, no method or system such as described above permits operations similar or related to those of U.S. Pat. Nos. 10,217,135 or 10,395,281 in an immersive digital environment.

Advertising contextual messages are seen today through the use of banner ads and other advertisements appearing from on-line or internet advertisers. There is, however, a problem with internet advertisements in that internet users rarely interact with today's advertisements multiple times, limiting their effectiveness. High advertising frequency (the number of times a user sees the ad) has a negative correlation with advertising effectiveness, and can damage the consumer-advertiser relationship. Another problem with internet advertisements is that engagement with present-day digital advertising (clicks, impressions, and object placements) last a fraction of a second, limiting their effectiveness. So, present day internet contextual advertising has not yielded general satisfactory results.

Contextual advertising, however, continues to grow in popularity as a mode of digital marketing communication.

Previous research on traditional media has shown that the surrounding context affects advertising effectiveness. Similarly, the context in a game may influence a player's processing of brands advertised in that game. To examine the effects of contextual advertising in games, various developers of video games are studying how positive and negative game contexts influence players' memories and attitudes with respect to brands advertised via billboards in games. Varying a game context may influence the perception of brands advertised in the game via the contextual priming mechanism and that positive contexts generate more positive brand attitudes than negative or neutral contexts. The findings have important implications for consumer researchers and marketers, as they indicate how contexts in games can be utilized to establish brand awareness and increase positive brand perceptions in contextual advertising using games.

In light of the growing awareness of contextual advertising in an immersive digital environment, there is presently the need for the ability to use factors underlying the effectiveness of advertisements in relation to a game's context. That is, there is a need for a method and system whereby advertisers can strategically use game contexts to meet their advertising goals, and it revealed a number of interesting insights. Such method and system would enable to make the best use of video games by strategically locating their advertisements in the contexts that will maximize advertising effectiveness.

A highly interactive VR environment involves both automatic and controlled allocation of cognitive resources. The amount of resources a player can devote to a VR stimulus might vary depending on the level of interactivity of the given task (e.g. driving a car and shooting an enemy), characteristics of the player (e.g. previous gaming experience and gaming skills), and the characteristics of the stimulus (e.g. size, color, sound and in-game events). In particular, different VR situations of environments require different amounts of mental resources, and most VR environments can involve highly stimulating audiovisual sensory information (e.g. alarm sounds, bonus points, aggressive enemy avatars and powerful weapons) and more engaging tasks (e.g., participating in combat, winning a reward, being killed by an enemy).

Research has demonstrated that contextual advertisement is capable of making changes to people's preset beliefs regarding specific brands by activating certain audience attributes. The resulting change in consumers' attitudes is known as the contextual priming effect. Because people interpret advertisements depending on currently activated concepts, immediately accessible contexts are more influential when interpreting adjacent messages such as advertisements.

As a result of developing abilities in constructing and using VR environments, as well as the ability to understand the dynamics and influences of contextual advertising, a variety of needs to form advertising and marketing objects and services capable of operating in VR environments In light of the above, further need exists for providing enhanced advertising opportunities in association with the dramatically more sensory-rich immersive digital environments.

There is the need for a methods and system for advertisers to dynamically deliver interactive and contextual advertisements to consumers in immersive digital software applications.

There is a further need for a method and system for dynamically and contextually replacing objects in a VR application with advertising opportunities in an immersive digital medium environment.

A need exists for a method and system to allow users to interact with dynamic immersive digital advertisements.

A further need exists for a method and system to create novel, enhanced advertising opportunities for brands and advertisers without intrusion-dependent ads, thereby preserving the perceptual integrity of the immersive digital environments. That is, there is a need for a way of delivering transaction-based or advertising content to electronic media users without disturbing the immersive experience that is paramount to this technology's prosperity, adoption, and overall success.

Yet a further need exists for a method and system by which advertisers may use the scientifically-proven heightened state of emotion that virtual reality, augmented reality, and similar immersive digital technologies can produce.

Finally, a need exists for the ability to create electronically enabled transactions that may effectively only occur in virtual reality, augmented reality, and similar immersive digital environments.

BRIEF SUMMARY OF THE INVENTION

The disclosed subject matter provides for a method and system for providing contextual communications and messages in immersive digital environments, additionally the present disclosure provides a method and system for providing advertising in immersive digital software applications.

In light of the above, the present disclosure provides a method and system for advertising dynamic content in an immersive digital medium user experience. The present method and system operate a plurality of computer processors and databases in an associated network for receiving, processing, and communicating instructions and data relating to advertising content in an immersive digital medium user experience. The method and system execute instructions and processing data relating to advertising objects, the advertising objects comprising images of objects, signs, labels, and related indicia of object origin for indicating sources of purchasing one or more objects for advertising. The method and system receive advertising instructions and data from a plurality of software applications for directing the use of said images for objects, signs, labels, and related indicia of object origin with said immersive digital medium user experience. The method and system respond to variations in said advertising instructions and data whereby operation of said computer processors and databases enables swapping out of various advertising messages and images according to the context of said immersive digital medium user experience.

The present disclosure further relates to methods for advertisers to dynamically deliver interactive advertisements to consumers in immersive digital software applications. These methods include how advertisements will be integrated into immersive digital software applications by the software developer, how users might interact with these advertisements, and how advertisers might place and pay for these advertisements.

In light of the present disclosure, here further appears a method and system for the system's ability to dynamically replace objects in a software application with advertising opportunities. Previously, any implementation of a system similar to this lacked the majority of this proposed system's potential.

The subject matter of the present disclosure provides ways to enhance advertising opportunities thanks to a dramatically more sensory-rich environment. Moreover, the presently explained and disclosed novel subject matter provides to allow users to interact with these dynamic advertisements. Thanks to the experience made possible by virtual reality and similar technologies, the user can walk right up to an advertised object and interact with it in whatever way the software developer programmed when creating their application.

In essence, the present disclosure enables a method and system to create novel, enhanced advertising opportunities for brands and advertisers without intrusion-dependent ads. Presently, most content is monetized or supplemented by intrusive forms of advertising that users have evolved to filter out. Whether it's television, radio, video games, or software—we've become mostly immune to advertisers' messages.

Moreover, the disclosed subject matter provides the technical advantage of being able to capitalize on advertising benefits of reaching a user during the heightened state of emotion that VR, AR, and similar technologies can produce. This benefit results in better advertising opportunities, which facilitate a beneficial association following the VR, AR, or similar experience. Researchers have performed studies to see what effect video games and other entertainment media has on users. Video games in particular often create a heightened state of emotion that, unbeknownst to the user, makes them more receptive to branded messages.

A technical advantage of the present disclosure includes the ability to bill on a novel, per-interaction basis (drinking, touching, eating, driving, turning on/off, listening to, etc.).

The disclosed subject matter also provides for the improvement of the system's ability to not only enable advertisers to capitalize on these enhanced opportunities, but for developers to monetize their content in an entirely new way, all while maintaining a large degree of control. Advertisers will benefit from this system, and developers stand to gain a great deal as well.

A yet further advantage of the presently disclosed subject matter includes an improved ability to all of this seamlessly, without disturbing the immersive experience that is paramount to this technology's prosperity, adoption, and overall success.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF ILLUSTRATIVE EMBODIMENTS

Figure 1:
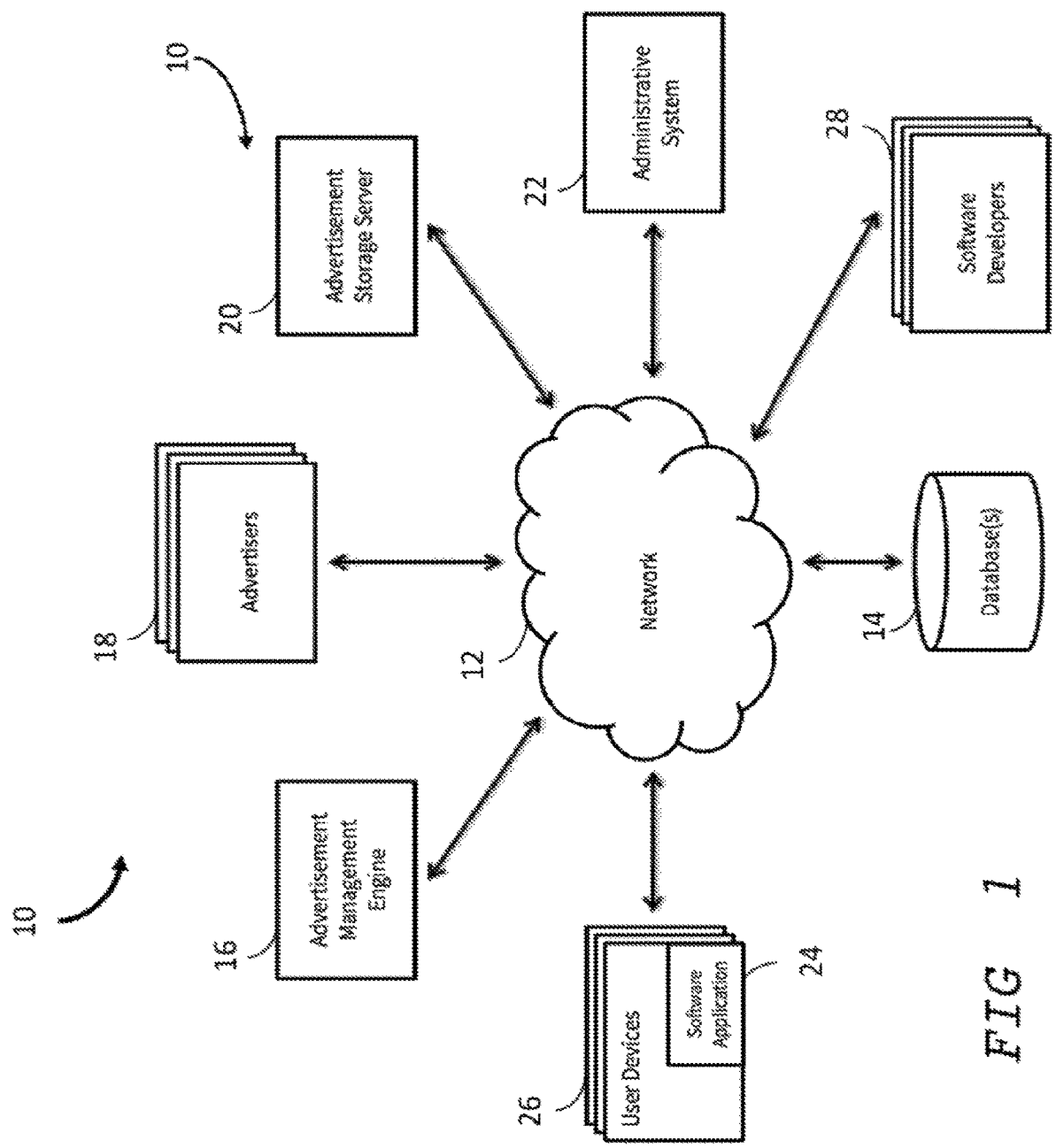
FIG. 1 depicts an architectural diagram of the presently disclosed method and system for providing advertising in immersive digital software applications.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present subject matter encompasses present and future known equivalents to the known components referred to herein by way of illustration.

Although method and system for providing advertising in immersive digital software applications here disclosed have been described in detail herein with reference to the illustrative embodiments, it should be understood that the description is by way of example only and is not to be construed in a limiting sense. It is to be further understood, therefore, that numerous changes in the details of the embodiments of this disclosed process and additional embodiments of this method and system for providing advertising in VR, AR software applications will be apparent to, and may be made by, persons of ordinary skill in the art having reference to this description. It is contemplated that all such changes and additional embodiments are within the spirit and true scope of this disclosed method and system as claimed below.

Virtual reality and similar immersive digital technologies present a unique challenge: A positive user experience is wholly dependent on immersion. If you break immersion, you risk completely compromising the experience. All of the aforementioned, presently available advertising options would compromise immersion. Users would avoid VR/AR/etc. software applications containing these forms of advertising, and software developers wouldn't leverage those forms of advertising as a result. This system is capable of facilitating highly potent advertising opportunities for brands/companies and a new form of monetization for developers, all without sacrificing immersion when integrated thoughtfully by advertisers and developers.

In short, virtual reality and similar technologies are elevating the possibilities of user entertainment to an unprecedented level. Integrating advertising into a technology so dependent on immersion presents a series of unique challenges, which creates the opportunity for many novel solutions.

FIG. 1 depicts an architectural diagram of the presently disclosed method and system for providing advertising in immersive digital software applications, here immersive digital environment system 10 as a network diagram depicting a computer network 12, according to one embodiment, having a client-server architecture configured for exchanging data over a network. For example, the immersive digital environment system 10 may be a publication/publisher system where clients may communicate and exchange data within computer network 12. The data may pertain to various functions (e.g., online item purchases) and aspects (e.g., managing content) associated with the computer network 12 and its users. Although illustrated herein as a client-server architecture as an example, other embodiments may include other network architectures, such as a peer-to-peer or distributed network environment.

Components of virtual reality advertising system 10, as FIG. 1 depicts include, therefore, computer network 12 which connects to advertising information database(s) 14. Advertisement management engine 16 communicates with computer network 12, in collaboration with at least one advertiser 18. Advertisement storage server 20 stores, processes, executes and communicates computer instructions and data relating to the advertising operations of virtual reality advertising system 10. Administrative system 22 processes and executes instructions relating to the administration of virtual reality advertising system 10, as described more fully below. Software applications 24 represents the functional and communications component of the disclosed subject matter, including software applications, that provide the ability to dynamically replace objects in software applications 24, which objects represent advertisements. This functionality empowers a software developer, associated with software applications 24, to augment and interact with virtual reality advertising system 10. Software developer application 24 associated with each of the user devices 26 provide a variety of software platforms and functions for fully virtual and augmented advertising applications and advertising functions. In the following paragraphs the present disclosure provides more information concerning the operation and benefits that these functional elements of the present virtual reality advertising system 10. These operations and benefits include a variety of behaviors, actions, and sub-components here described.

Computer network 12 serves as a central hub that connects all components of immersive digital environment system 10 via WAN/LAN/Internet or other means. Connections within the present scope may include a combination of hardware/software that interprets data being sent and received by other components of the system. Computer network 12 routes instructions and data to a relevant server, such as database 14, software developer application 24, user devices 26, etc.

Advertising information database(s) 14 stores and communicates advertiser information, user information, software information, and advertisement information. Advertiser information, for example, may include an advertiser profile including, for example, entity name, entity description, etc. Billing Information stored within advertising information database(s) 14 may include billing address, financial accounts, budget, etc. Moreover, advertising information database(s) 14 may store advertiser preferences including, for instance, time of day, preferred user demographics, preferred user interests, preferred user behaviors, preferred devices, preferred software applications, etc. Within advertising information database(s) 14, also may be stored user information, such as demographics information. This may include age, sex, ethnicity, language, education, income, household information, other common demographic data, etc. relevant to immersive digital environment system 10 users.

Behaviors also may be stored in advertising information database(s) 14. This kind of data may include historical data regarding user behavior within software applications 24. For example, interactions with objects, interactions with other users, selected skill level, anything else taking place in a software application 24 may reside in advertising information database(s) 14. Historical data regarding user behavior in reality (geographic regions visited, types of establishments visited, amount of time spent in certain locations, or any other trackable activity the user performs in reality may also be stored in advertising information database(s) 14.

User devices 26 may provide to advertising information database(s) 14 information regarding which devices, such as a head mounted display (HMD) a user owns, has owned, has logged into their user account from, etc. Advertising information database(s) 14 may store, also, interests, such as brand preferences, brand tendencies, entertainment preferences (games, movies, celebrities, music, literature, etc.), activities, affinities, etc.

To enable immersive digital environment system 10 to operate software developer application 24, advertising information database(s) 14 may store software information, as well as compatible devices such as computers, mobile devices, virtual reality headsets, etc. As for different types of advertising information usable with virtual reality advertising system 10, advertising information database(s) may store advertising category information, such as educational, game, experience, movies & television, etc. categories; advertising genres; advertising rating information, such as intended audiences, due to content such as graphic violence, nudity, profanity, etc.

Advertising information database(s) may, furthermore, store advertisement information, such as virtual environment physical dimensions, were applicable, file type & format, and various limitations, such as maximum file size, content guidelines (e.g., appropriateness, developer-specified restrictions, etc.)

The context of an advertisement may be stored and accessed via advertising information database(s) 14, to include software category, software genre, environment, potential interaction, etc. The number of advertisements, such as how many advertising opportunities are present within a given software application is a storable aspect for advertising information database(s) 14.

Advertising information database(s) 14 may include locations of advertisements, such as where advertising opportunities are located within their corresponding software applications 24. Display eligibility, as to whether or not an available advertising opportunity has eligible advertisements to display. Advertising information database(s) 14 may further include billing triggers to include numbers of impressions, user interactions, etc.

Advertisement management engine 16 maintains a constant connection to the advertisement information database 14 to determine available advertisements, quantity and locations of available advertisements within a software application 24, advertisement display eligibility, advertisement billing triggers, etc. Advertisement management engine 16 receives requests for information from software applications 24 on a user device 26 when the user triggers an event to retrieve assets and eligibility information from advertising information database(s) 14.

Advertisement management engine 16 may include a serving mechanism for determining whether or not advertisements for that object are eligible to be displayed based on advertisement approval status, advertiser preferences such as user demographics, time of day, bid, etc. The serving mechanism of advertisement management engine 16 interprets data from the advertisement information advertising information database(s) 14 and determines whether or not an advertisement is eligible to be displayed. In some embodiments, eligibility may be computer determined by the advertisement management engine 18. In some embodiments, the eligibility may be manually determined and fed to the system for further processing. In some embodiments, the eligibility may be pre-determined by the at least one advertiser and be retrieved from the at least one advertiser.

If an object available for rent does not have any advertisements currently eligible to display, the default asset set by the software developer is displayed on a display as may be described in FIG. 3, below. If the serving mechanism receives information for a single eligible advertisement, the advertisement management engine 16 sends eligible assets to the software application 24. If the serving mechanism receives information that indicates multiple advertisements are eligible to display, an algorithm may determine which advertisement to display based on advertiser bid, user demographics, user behavior, user interests, optimal user experience, etc. or any combination thereof. The advertisement management engine 106 then sends assets of the determined eligible advertisement to the software application 24. The eligible assets are then seen or interacted with by the user on user device 26, and corresponding billing trigger information is sent to the advertisement information database 14.

The at least one advertiser 108 may receive various advertising requests and input from at least one advertiser seeking to use virtual reality advertising system 10. Administrative system 112 receives data via at least one advertiser 108, which may include profile information, billing information, targeting information, assets, etc. immersive digital environment system 10 transmits this data to the appropriate components and database(s) 14 for use and storage. Administrative system 22 communicates billing information to the at least one advertiser 18 when a threshold of fees, accumulated from interactions and/or impressions from the advertiser's ad placements within software applications 24, is met.

Advertisement storage server 20 stores advertiser assets such as images, videos, audio files, scripts, formulas, etc. Advertisement storage server 20 further sends and receives data to/from the advertisement management engine 16 to present advertisement assets to the user. Advertisement storage server 20 may also send and receive data directly to/from the advertisement information database(s) 14, if not routed through the advertisement management engine 16 to perform this action.

Administrative system 22 receives data from software developer 28 to create a unique account within the system. This may include entity information, profile information, a list of software applications they offer rental opportunities in, demographic information, financial account information, etc. Administrative system 22 receives data from software developer 28 via an interface to register objects available for rent within their software applications 24. This data may include information about their software application, object dimensions, information about the context of the object within their software application, developer-specific requirements for that available object, the object's default asset in case the system does not have any eligible advertisements to display, etc.

Administrative system 22 sends this data for storage in the advertisement information database(s) 104. Administrative system 22 further presents software developer with a unique code exclusive to that object/advertising opportunity. Through a software, the software developer 28 may install this code or script within their software application's code to send and receive data to/from the advertisement management engine 16. The code may be installed in software developer 28 independent of administrative system 22. The code allows the software 28 to communicate with system 22.

Administrative system 22 receives data from the at least one advertiser 18, which data may include entity information, opportunity preferences, user preferences, demographics, financial account information, etc. Administrative system 22 presents at least one advertiser 18 with information about objects that are available for rent via an interface. This information presented to the at least one advertiser 18 is the data specified by the software developer 28 such as object dimensions, advertising requirements, etc.

When an advertiser identifies an object/advertisement opportunity that they would like to rent, the system receives their application information for review/approval via the at least one advertiser 18. This may include preferred billing triggers such as impressions and/or interactions, assets, a message to the software developer 28 and/or approval team, etc. If the immersive digital environment system 10 denies the application, the system will notify the advertiser. If the immersive digital environment system 10 approves the application, the system stores the advertiser's data such as time of day, preferred user demographics, preferred user interests, preferred user behaviors, preferred devices, preferred software applications 24, etc. within the advertisement information database 14.

Immersive digital environment system 10 sends the advertiser's approved assets to the advertisement storage server 20 for storage. Immersive digital environment system 10 sends data to the advertisement management engine 16 so that this advertisement may be presented to the user in place of the software developer's default object within the software application 24. Administrative system 22 bills the at least one advertiser 18 when a billing threshold is met such as number of impressions, number of interactions, etc. for their selected advertising opportunities. Administrative system 22 also pays the software developer when a threshold is met for earnings accumulated from advertising opportunities within their software applications 24.

Software application 24 may be created by the software developer 28 and contains objects specified by the software developer 28 to communicate with the advertisement management engine 16 via a unique code provided by the administrative system 22 upon registration of the object. Software application 23 notifies advertisement management engine 16 when a user activates an event to apply assets to an object available for rent within the software application 24. If software application 24 receives data from advertisement management engine 16 that indicates the object is not rented, the system applies the default asset to that object within the software application 24. If the software application 24 receives data from the advertisement management engine 16 that indicates the object has an eligible advertisement to be displayed, the system applies the advertiser's asset to that object to be seen by, interacted with, or otherwise experienced by the user. If a billing trigger is activated for an eligible advertisement, the software application 24 sends that data to the advertisement information database(s) 14.

User devices 26 run the software applications 24 created by the software developer 28 and furthermore receive input from the user, as well as send and receive data with advertisement management engine 16.

Software Developer 28 provide software applications 24 intended for users device 26. Input data for administrative system 22 and advertisement management engine 16 makes objects within their software applications 24 available for advertising opportunities. Administrative system 22 pays developer when a threshold is met for earnings accumulated from advertising opportunities within their software applications 24.

Figure 2:
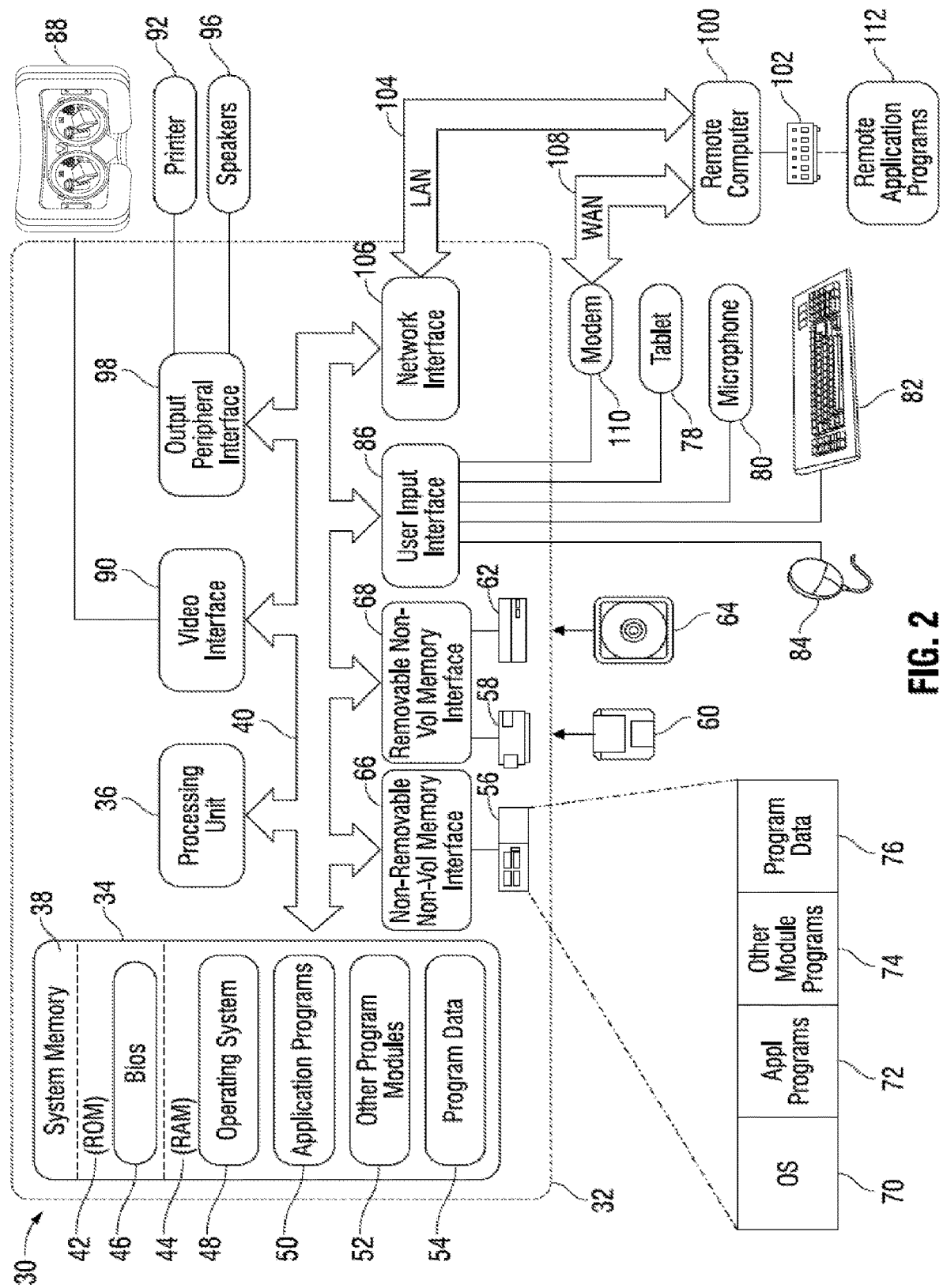
FIG. 2 diagrams an exemplary system within a computing environment for implementing the disclosure and includes a general purpose computing device in the form of computing system.

FIG. 2 provides an exemplary system within the computing environment 30 for implementing the disclosure. While an example of a particular user device 26 may be a virtual reality head mounted display, other computing platforms for computing environment 30 may be in the form of a desktop computer. Other client devices may include, but are not limited to, laptop computers and mobile phones (e.g. smart phones). In various embodiments, the client device includes at least one processor, display, image capture device, network interface, and input device. The display may be a touchscreen or non-interactive display. In an embodiment, the image capture device is a camera.

To explain the relationship between computing environment 30 of FIG. 2 with immersive digital environment system 10 of FIG. 1, it is a beneficial to appreciate that immersive digital environment system 10 may be practiced on a wide variety of differing user device 26 that may be associated with computing environment 30 or a stand alone computing environment. So, the functional aspects of network 12, database(s) 14, advertisement management engine 16, advertisers 18, advertisement storage server 20, administrative system 22, and software applications 24 may reside at various locations within computing environment 30, depending on various hardware and software architectural consideration. Accordingly, the various hardware and computing functions necessary for the operation of immersive digital environment system 10 should be appreciated within the context of an operable computing environment, such as computing environment 30 of FIG. 2.

The network interface may be configured to transmit and receive on multiple frequencies 4G, 3G, 802.11, etc.) over network 14 with virtual reality advertising system 10. The input device may be a keyboard, touchscreen, gesture capture, stylus or a combination thereof. In various embodiments, computing environment 30 also includes one or more applications that are executed by the at least processor. The executed applications may be configured to perform the functions and methods described herein.

Computing environment 30, thus may include a general purpose computing device in the form of computing system 32, commercially available from, for example, Intel, IBM, AMD, Apple, Motorola, Cyrix, etc. Components of computing system 34 may include, but are not limited to, processing unit 36, system memory 38, and system bus 40 that couples various system components including system memory 38 to processing unit 36. System bus 40 may be any of several types of bus structures including a memory bus or memory controller, a peripheral bus, or a local bus using any of a variety of bus architectures.

Computing system 32 typically includes a variety of computer readable media. Computer readable media can be any available media that can be accessed by computing system 32 and includes both volatile and nonvolatile media, and removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 32.

System memory 38 may include or associate with the advertising information database(s) 14 and includes computer storage media in the form of volatile and/or nonvolatile memory such as read only memory (ROM) 42 and random access memory (RAM) 44. A basic input/output system (BIOS) 46, containing the basic routines that help to transfer information between elements within computing system 32, such as during start-up, is typically stored in ROM 42. RAM 44 typically contains data and/or program modules that are immediately accessible to and/or presently being operated on by processing unit 36. By way of example, and not limitation, operating system 48, application programs 50, other program modules 52, and program data 54 are shown.

Computing system 32 may also include other removable/non-removable, volatile/nonvolatile computer storage media. By way of example only, hard disk drive 56 that reads from or writes to non-removable, nonvolatile magnetic media, a magnetic disk drive 58 that reads from or writes to removable, nonvolatile magnetic disk 60, and an optical disk drive 62 that reads from or writes to removable, nonvolatile optical disk 64 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 56 is typically connected to the system bus 40 through a non-removable memory interface such as interface 66, and magnetic disk drive 58 and optical disk drive 62 are typically connected to the system bus 40 by a removable memory interface, such as interface 68.

The drives and their associated computer storage media, discussed above, provide storage of computer readable instructions, data structures, program modules and other data for computing system 32. For example, hard disk drive 56 is illustrated as storing operating system 70, application programs 72, other program modules 74 and program data 76. Note that these components can either be the same as or different from operating system 48, application programs 50, other program modules 52, and program data 54. Operating system 70, application programs 72, other program modules 74, and program data 76 are given different numbers here to illustrate that, at a minimum, they are different copies.

A user may enter commands and information into the computing system 32 through input devices such as tablet or electronic digitizer 78, microphone 80, keyboard 82, and pointing device 84, commonly referred to as a mouse, trackball, or touch pad. These and other input devices are often connected to the processing unit 36 through a user input interface 86 that is coupled to the system bus 40, but may be connected by other interface and bus structures, such as a parallel port, game port or a universal serial bus (USB).

Head mounted display (HMD) 88 or other type of display device is also connected to the system bus 40 via an interface, such as a video interface 90. HMD 88 may also be integrated with a touch-screen panel 92 or the like. Note that the monitor and/or touch screen panel can be physically coupled to a housing in which computing system 32 is incorporated, such as, for example, in a tablet-type personal computer or smart phone. In addition, computers such as computing system 32 may also include other peripheral output devices such as speakers 94 and printer 96, which may be connected through an output peripheral interface 98 or the like.

Computing system 32 may operate in a networked environment using logical connections to one or more remote computers, such as a remote computing system 100. The remote computing system 100 may be a personal computer (including, but not limited to, mobile electronic devices), a server, a router, a network PC, a peer device or other common network node, and typically includes many or all of the elements described above relative to computing system 32, although only a memory storage device 102 has been illustrated. The logical connections depicted include a local area network (LAN) 104 connecting through network interface 106 and a wide area network (WAN) 108 connecting via modem 110, but may also include other networks such as, for example, mobile telephone service networks. Such networking environments are commonplace in offices, enterprise-wide computer networks, intranets, mobile networks, and the Internet.

For example, in the present embodiment, computer system 32 may comprise the source machine from which data is being generated/transmitted and the remote computing system 100 may comprise the destination machine. Note however that source and destination machines need not be connected by a network or any other means, but instead, data may be transferred via any media capable of being written by the source platform and read by the destination platform or platforms.

In another example, in the present embodiment, remote computing system 100 may comprise the source machine from which data is being generated/transmitted and computer system 32 may comprise the destination machine.

In a further embodiment, in the present disclosure, computing system 32 may comprise both a source machine from which data is being generated/transmitted and a destination machine and remote computing system 100 may also comprise both a source machine from which data is being generated/transmitted and a destination machine.

Referring to FIG. 2, for the purposes of this disclosure, it will be appreciated that remote computer 100 may include any suitable term such as, but not limited to "device", "processor based mobile device", "mobile device", "electronic device", "processor based mobile electronic device", "mobile electronic device", "wireless electronic device", or "location-capable wireless device," including a smart phone or tablet computer.

The central processor operating pursuant to operating system software such as, but not limited to, Apple IOS®, Google Android® IBM OS/2®, Linux®, UNIX®, Microsoft Windows®, Apple Mac OSX®, and other commercially available operating systems provides functionality for the services provided by the present invention. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation, and algorithm generation. The provided functionality may be embodied directly in hardware, in a software module executed by a processor, or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk, or any other form of storage medium known in the art. An exemplary storage medium is coupled to the processor such that the processor can read information from, and write information to, the storage medium. In the alternative, the storage medium may be integral to the processor. The processor and the storage medium may also reside in an Application Specific Integrated Circuit (ASIC). The bus may be an optical or conventional bus operating pursuant to various protocols that are well known in the art.

Figure 3:
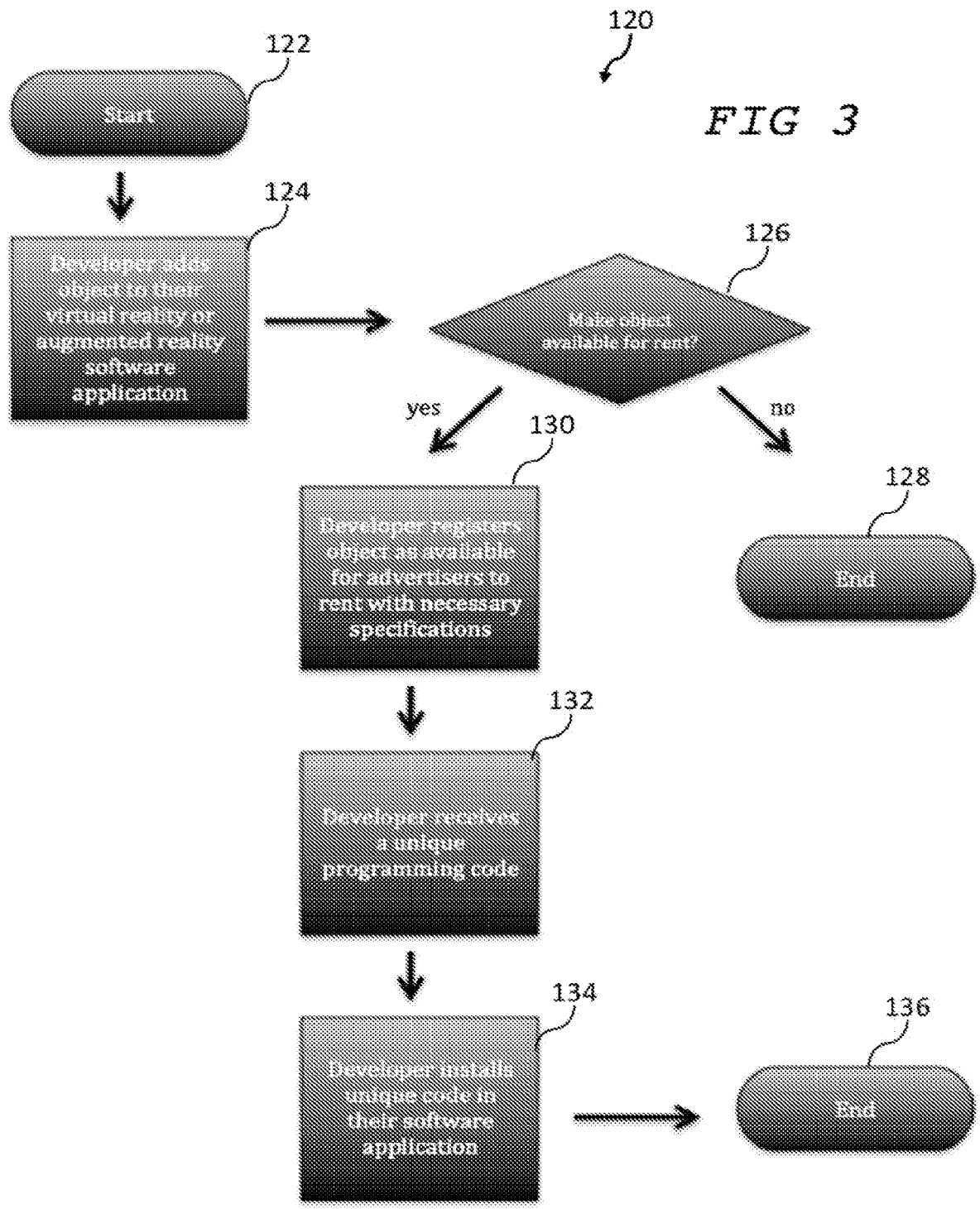
FIG. 3 is a flow diagram of a method for developer to create, register, and implement rented objects within their immersive digital software applications.

FIG. 3 presents a developer flow process for a method for developer to create, register, and implement rented objects within their immersive digital software applications. Flow diagram 120 portrays the developer flow process of the present disclosure, thus, illustrating an example of how a developer might create and register an object within a software application 24 for rent. The developer starts at step 122, first designs the object within their software application, at step 124. Then the developer decides whether or not they want to make this particular object within their application available for the at least one advertiser to rent, at step 126. If no, the object will behave normally as specified by the developer's programming, at step 128. If yes, the developer registers the object for rent at step 130, outlining all necessary specifications for the rented object (length, width, height, subject-matter restrictions, preferences, etc.). Once the developer successfully registers this object for rental within the database, they are supplied a unique code, at step 132, to integrate into their software application, at step 134, where they would like that rented object to appear. Developer flow process concludes at step 136.

Figure 4:
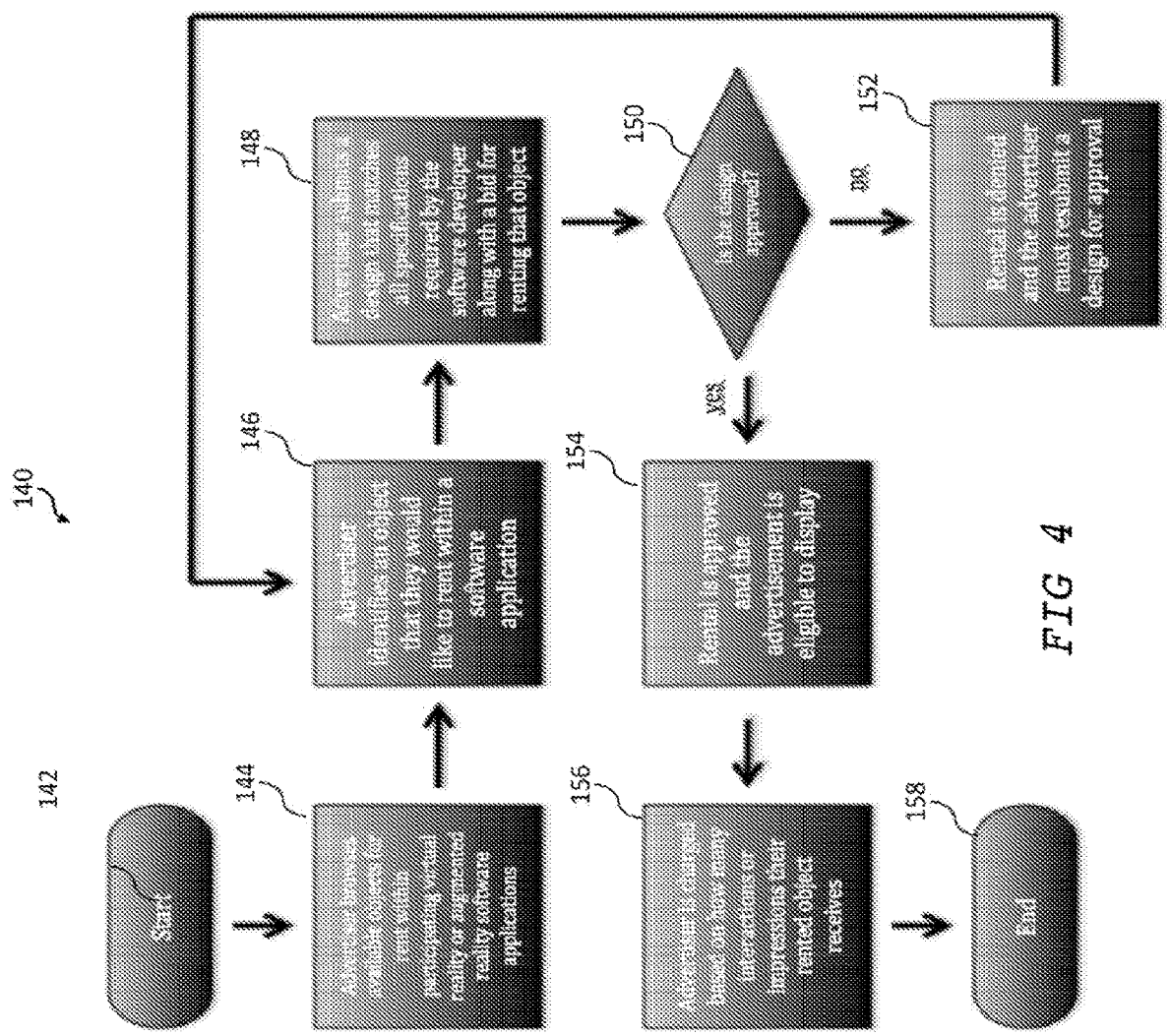
FIG. 4 shows a flow diagram of a method for advertisers to rent objects made available by developer in software applications.

FIG. 4 shows the advertiser flow process of the present disclosure as a method for the at least one advertiser to rent objects made available by developer in software applications. Referring to FIG. 4, advertiser flow diagram 140 starts at step 142 and illustrates an example of how an advertiser might browse, identify, rent, and pay for advertisements within software applications where developer has created rentable objects. The advertiser begins at step 144 by searching for an advertising opportunity by browsing a database of rentable objects and reviewing their specifications as outlined by the developer. Upon finding an advertising opportunity of interest, step 146, the advertiser may submit a design that matches the specifications outlined by the developer for approval along with a bid for that rentable object, step 148. If the design is denied, step 150, the advertisement is not eligible to be displayed, the advertiser must resubmit a design for approval, step 152. If the advertisement is approved, step 154, the advertisement is eligible for display and immersive digital environment system 10 begins rendering to users within the developer's software application. At least one advertiser would be charged, step 156, based on the number of impressions or number of interactions within the software application. Advertiser flow diagram 140 stops at step 158.

Figure 5:
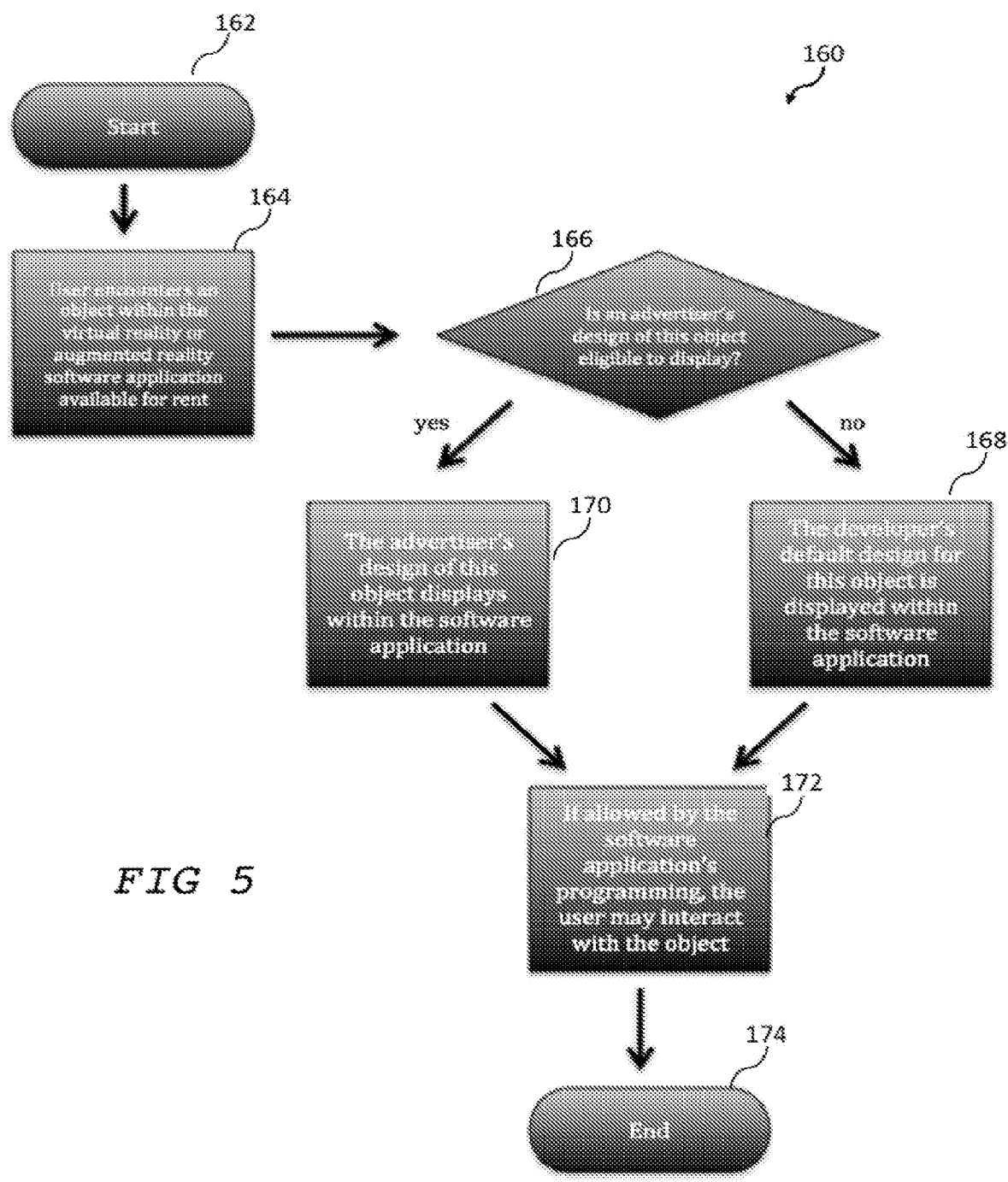
FIG. 5 illustrates a flow diagram of an example interaction that a user might have when encountering rented objects in software applications.

FIG. 5 illustrates a flow diagram 160 of an example interaction that a user might have when encountering rented objects in software applications. Referring to FIG. 5, user interaction flow diagram 160 starts at step 162 to illustrate how a user may interact with a rentable object in a software application 26. When the user encounters an object, step 164, that has been made available by the developer for rent, they will see one of two possible renderings of this object. If there is not an advertisement eligible for display, step 166, the user will see the default object designed by the developer, step 168. If there is an advertisement eligible for display, step 166, the user will see the advertiser's design of the object, step 170. If allowed by the software application's programming, the user will also be able to interact with this rented object, step 172. User interaction flow diagram 160 stops at step 174.

Figure 6:
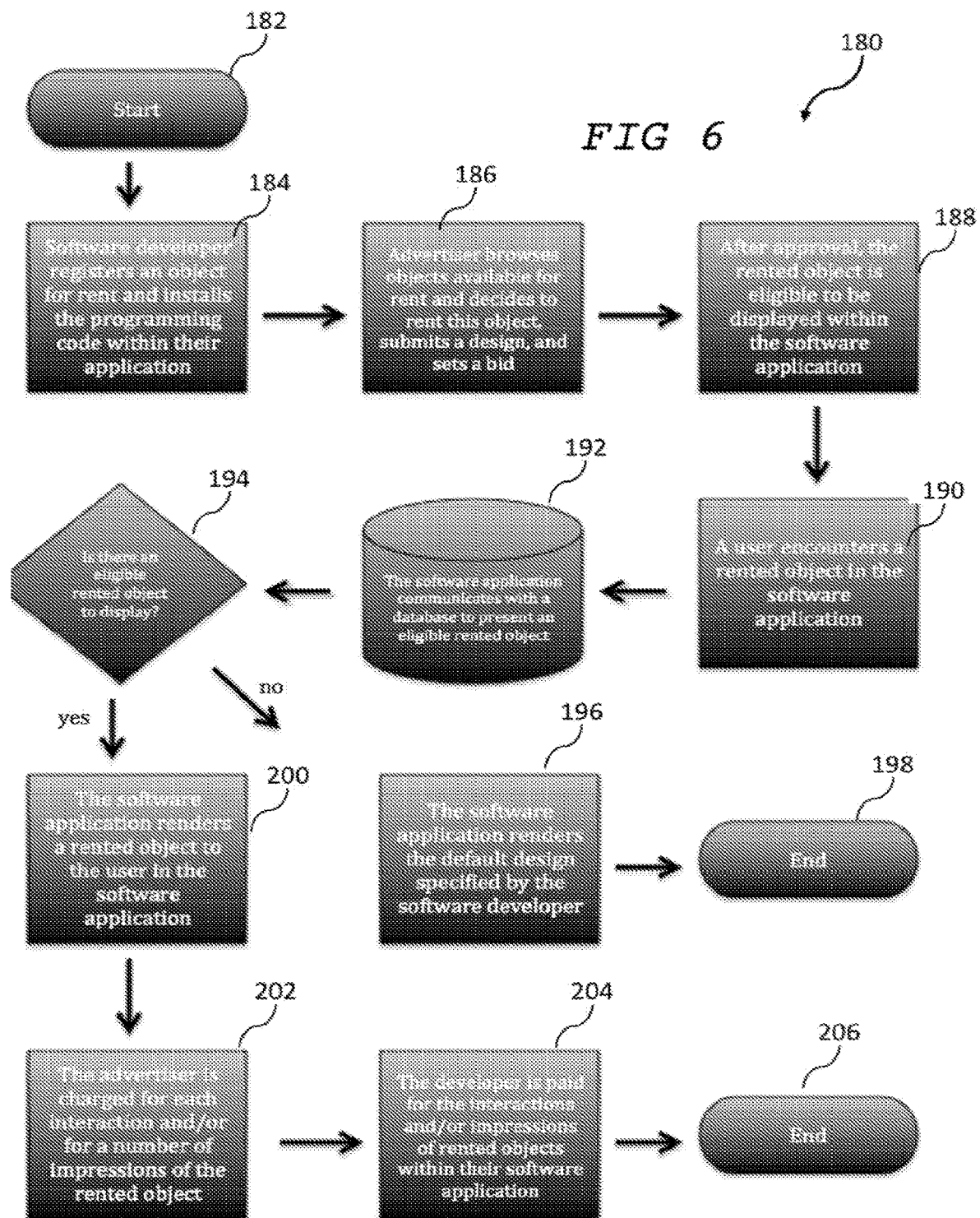
FIG. 6 is a flow diagram of an example delivery system that would facilitate the process between advertisers and developer when renting objects within a software application.

FIG. 6 shows flow diagram 180 depicting an example delivery system that would facilitate the process between at least one advertiser and developer when renting objects within a software application. Referring to FIG. 6, delivery system flow diagram 180 shows an example overview of how these developer, advertiser, and user processes might work together, starting at step 182. Once a software developer registers the object for rent, step 184, he installs the programming code within their application and submits the design and sets a bid. After approval, the rented object is eligible to be displayed within a software application 24. When an advertiser browses to encounter a rentable object within the software application, at step 186, the advertiser submits the design of interest and sets a bid. After, approval, the rented design or object is eligible to be displayed within the software application. At step 190, a use may encounter a rented object in the software application 26. At step 192, software application 26 communicates with database(s) 14 to present an eligible rented object.

Delivery system flow diagram 180 continues to test whether there is an eligible rented object to display, at step 194. If no, the user will see the default design specified by the software developer, at step 196, after which delivery system flow diagram 180 ends at step 198. If yes, the user will see the advertiser's design (referred to as a "rented object") instead of the default design, at step 200. The user can interact with that advertisement if the programming allows for it, and the advertiser could be charged per interaction and/or per number of impressions, at step 202. The revenue from these rented objects would be passed onto the developer, probably less a fee from the intermediary facilitating this transaction, at step 204. Delivery system flow diagram 180 ends, then, at step 206.

As a result of delivery system flow diagram 180, the user has now interacted with advertising in a way that does not negatively affect the immersive experience made possible by immersive digital, the advertiser has paid for a handpicked advertising opportunity of significantly higher quality than what was possible prior to this technology gaining prevalence, and the developer has an option for monetizing their software application without sacrificing their desired user experience.

Figure 7:
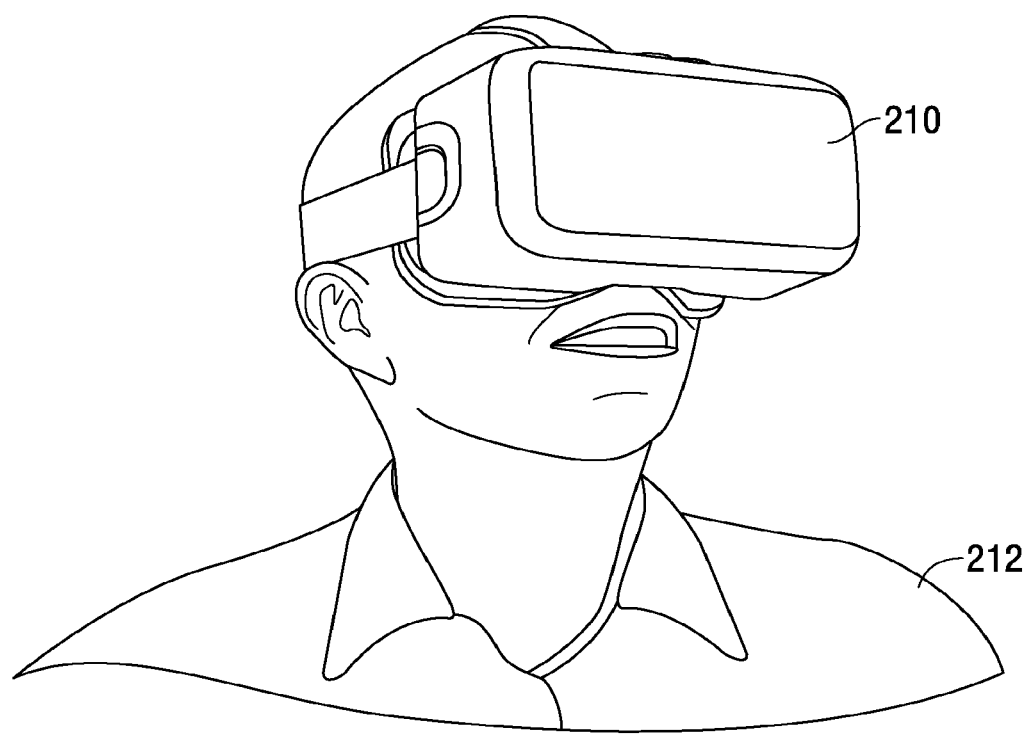
FIG. 7 depicts a user employing an immersive digital medium head mounted display that may employ the teachings of the present disclosure.
Figure 8:
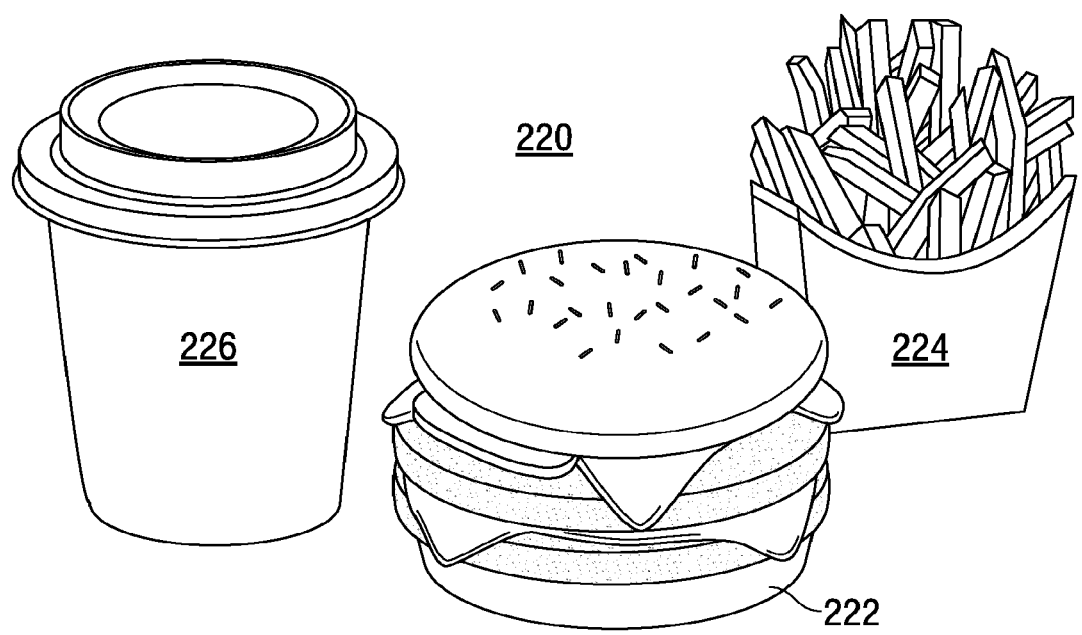
FIG. 8 portrays how a immersive digital environment may appear to the user employing the head mounted display of FIG. 7.
Figure 9:
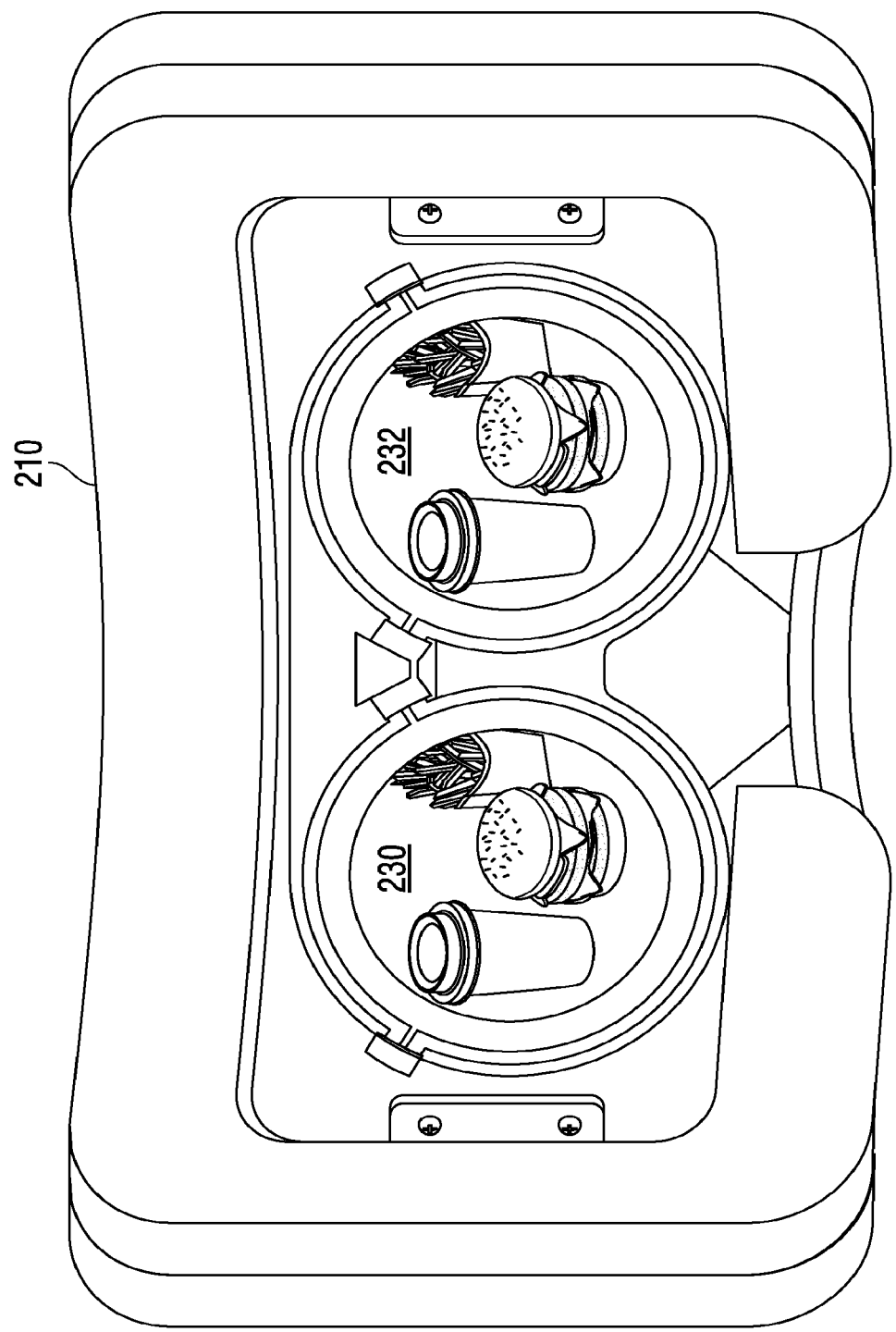
FIG. 9 depicts how the immersive digital environment of FIG. 8 may appear through the viewing lenses of a head mounted display.

FIG. 7 illustrates how a head mounted display (HMD) 210 for viewing a virtual reality environment may occur by a user 212 wearing the device to begin a virtual reality experience. In FIG. 8 appears a simplified example of a generic immersive digital environment with a virtual meal 220 of a hamburger 222 accompanied by a serving of French fries 224 and cup of coffee 226. Thus, virtual meal 220 exemplifies what a user may see if no advertisements in the database were eligible to render, or if there were no advertisers for those rentable objects. The example of FIG. 8, further demonstrates that there may be at least three objects for rent in their software application. The illustration may further show virtual reality objects including, but not limited to, a table, a fork, a knife, a plate, a cup with a straw, and a wrapped sandwich in the middle of the plate. In this example illustration, one may consider that the virtual reality images for hamburger 222, French fries 224, and coffee 226 are available for rent by software developer who have created the images through software 28. In applying software developer process flow 120 of FIG. 3, and software developer have successfully registered hamburger 222, French fries 224, and coffee 226 as rentable within database(s) 14 and implemented the programming code to communicate via network 12 between software applications 24 and database(s) 14. Referring again to FIG. 8, hamburger 222, French fries 224, and coffee 226 are displayed in the default design that a developer may specify for a software application 26. Thus, although they have been registered as available for rent, there are not any ads eligible to be shown at the moment that user 212 encounters these objects. Also, FIG. 9 depicts what user 212 may see through the display screens 230 and 232 of HMD 210.

Figure 10:
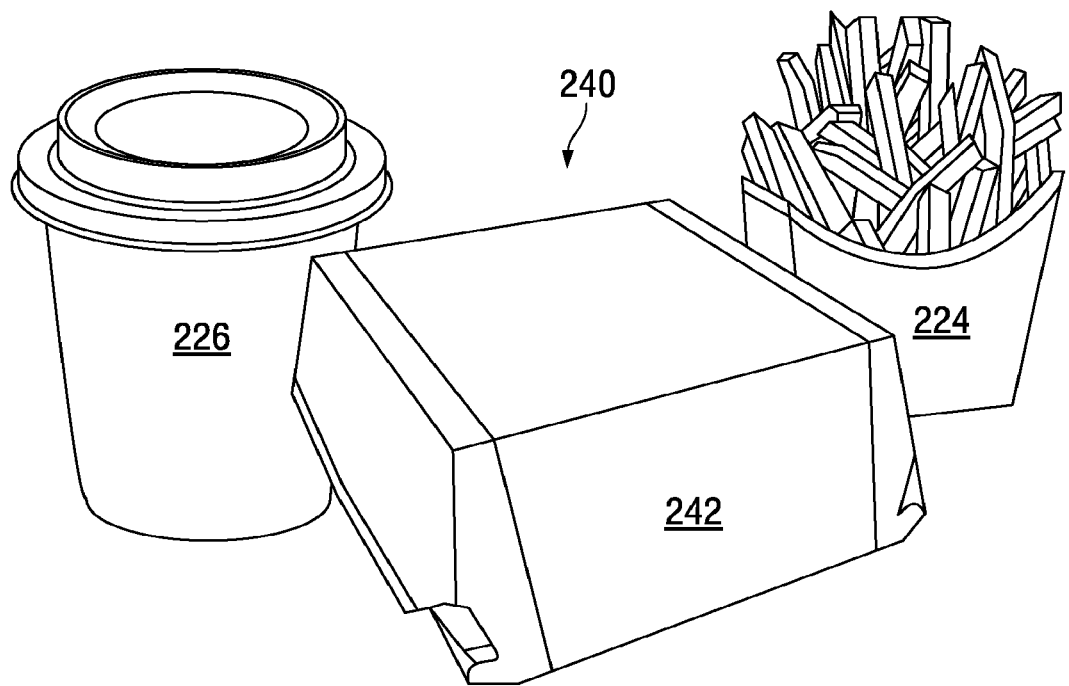
FIG. 10 more particularly illustrates a potential location for an advertisement that may appear in the immersive digital environment of FIG. 8 exemplary application of the presently disclosed subject matter.

FIG. 10 is an illustration 240 of an example of what user 212 may see if only one object available, here hamburger 222, for rent were rented by at least one advertiser. Referring to FIG. 8, the hamburger 222 has been rented by an advertiser and their design is eligible for display, causing their design to render as a boxed hamburger 242 within a "Big Mac" box, instead of the default design specified by the developer. The different boxed hamburger 242, effectively allows an advertiser working through the at least one advertiser 18 to rent the boxed hamburger 242 object in the presently disclosed virtual reality advertising system 10.

If allowed by operating software application 24, user 212 could also interact with this advertisement by picking it up and taking a bite of the hamburger, which might execute an action specified by the developer or advertiser (regenerated health, augmented vision, improved resources, unlocked achievement, etc.). In another application of this disclosure, user 212 also may be able to experience smell or sound of the hot hamburger 242 or other sensation. In some instances of this disclosure, those details could also be controlled by an advertiser through at least one advertiser 18. In yet another application of this disclosure, at least one advertiser 18 may allows depositing a piece of data on user's 212 device upon interacting with a rented object for later viewing, or for the purposes of advertising and communicating with that user in the future. This could include a digital tracking file such as a cookie, a hyperlink, a text or image message, etc.

Figure 11:
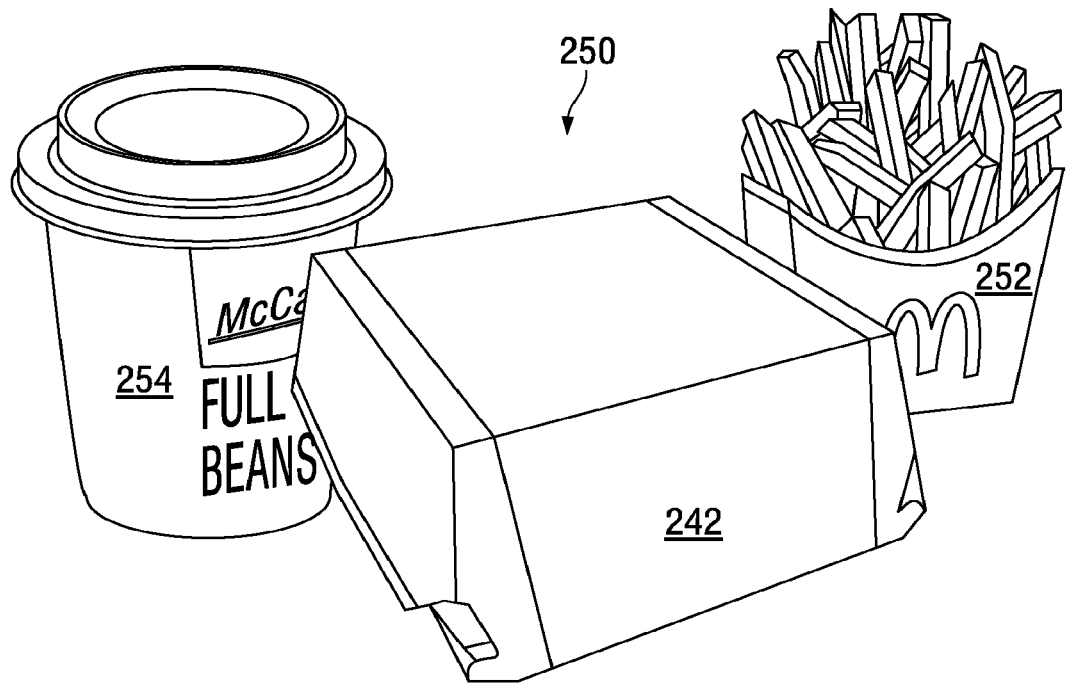
FIG. 11 further illustrates how application of the presently disclosed subject may alter the potential location for advertisement in a immersive digital environment, as illustrated in FIG. 10.
Figure 12:
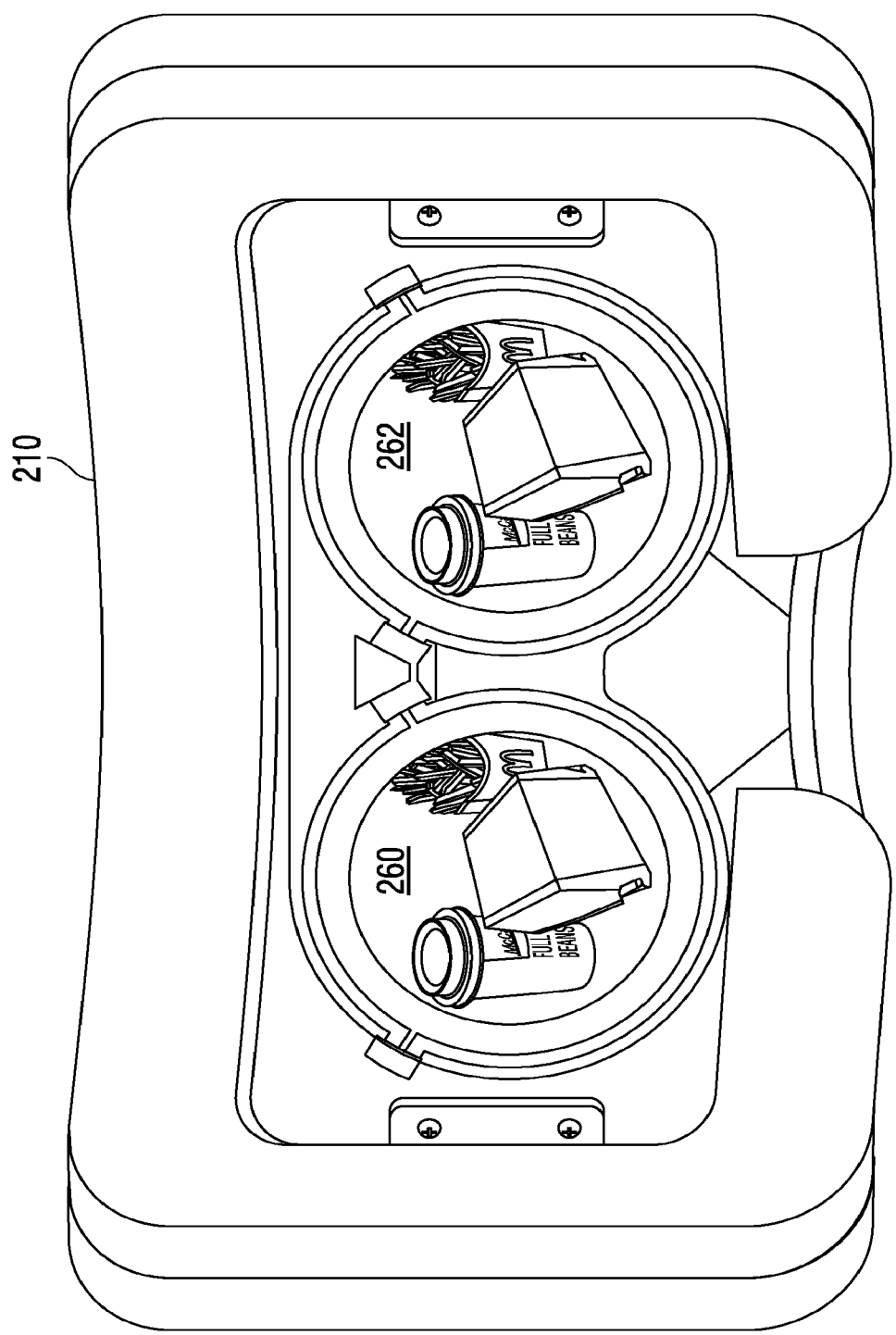
FIG. 12 portrays how the immersive digital environment of FIG. 11 may appear to the user of the head mounted display following application of the teachings of the present disclosure.

FIG. 11 shows is an illustration of an example of what a user might see if all three, hamburger 212, French fries 214, and coffee 216 were objects available for rent and were rented by at least one advertiser. Referring to FIG. 11, the rented boxed hamburger 242, branded French fries 252, and branded coffee have been rented by at least one advertiser with designs eligible for display. Similar to what is described for FIG. 10, user 212 could unwrap and eat boxed hamburger 242, which might execute an action specified by the developer or advertiser. This allows the at least one advertiser 18 to exercise an opportunity to secure complex brand interactions with users that were previously impossible. User 212 will experience this object very similarly to how they might in reality, and if it creates an emotional reaction for user 212 due to the experience, those emotions can be associated by user 212 with the advertiser's rented object and brand.

Figure 13:
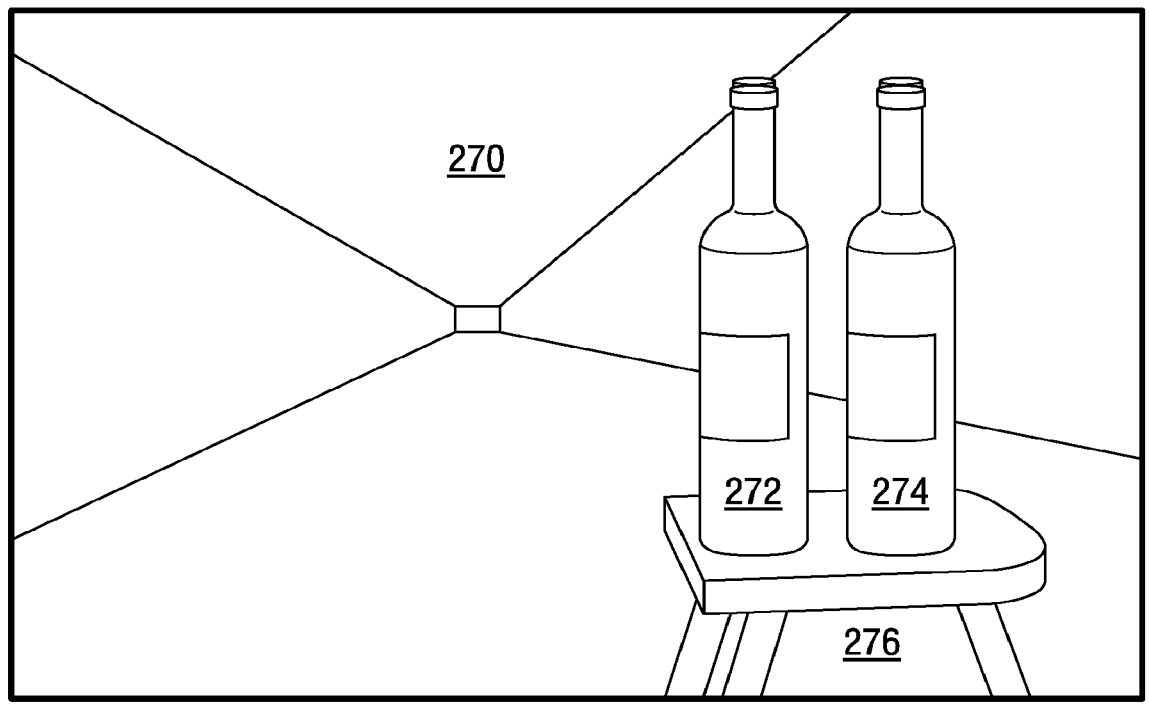
FIG. 13 further shows a different virtual reality environment wherein application of the presently disclosed method and system may occur.
Figure 14:
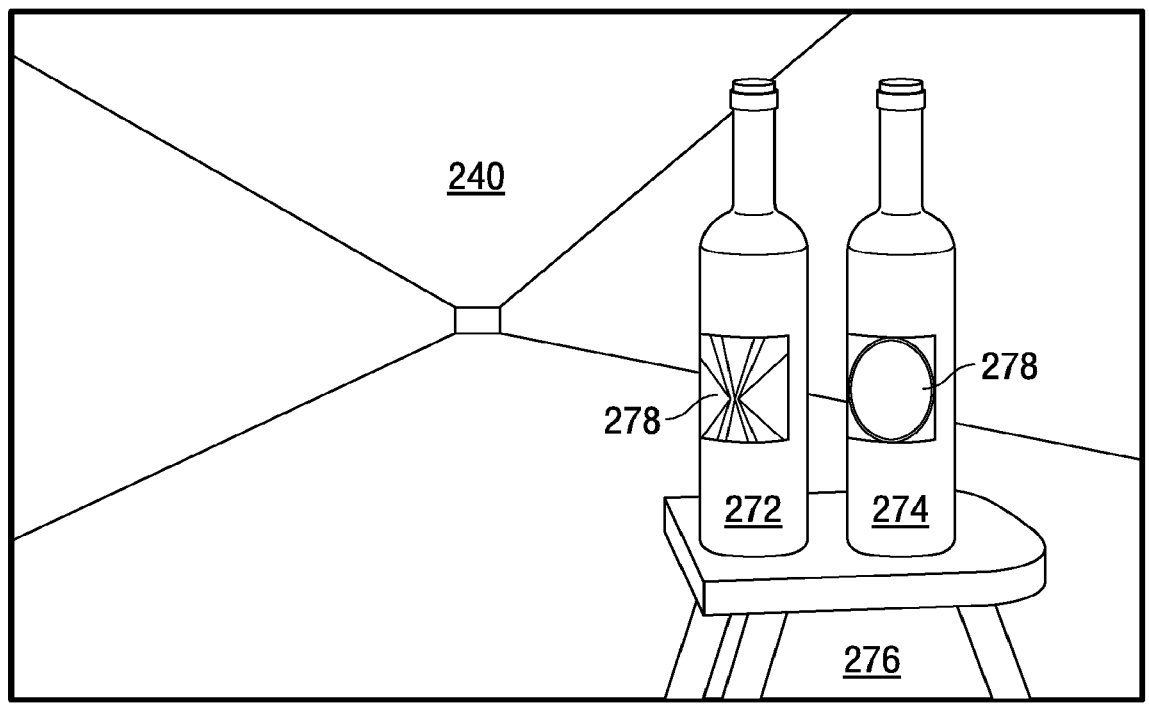
FIG. 14 shows how the teachings of the present disclosure may apply to permit advertising with the virtual reality environment of FIG. 13.
Figure 15:
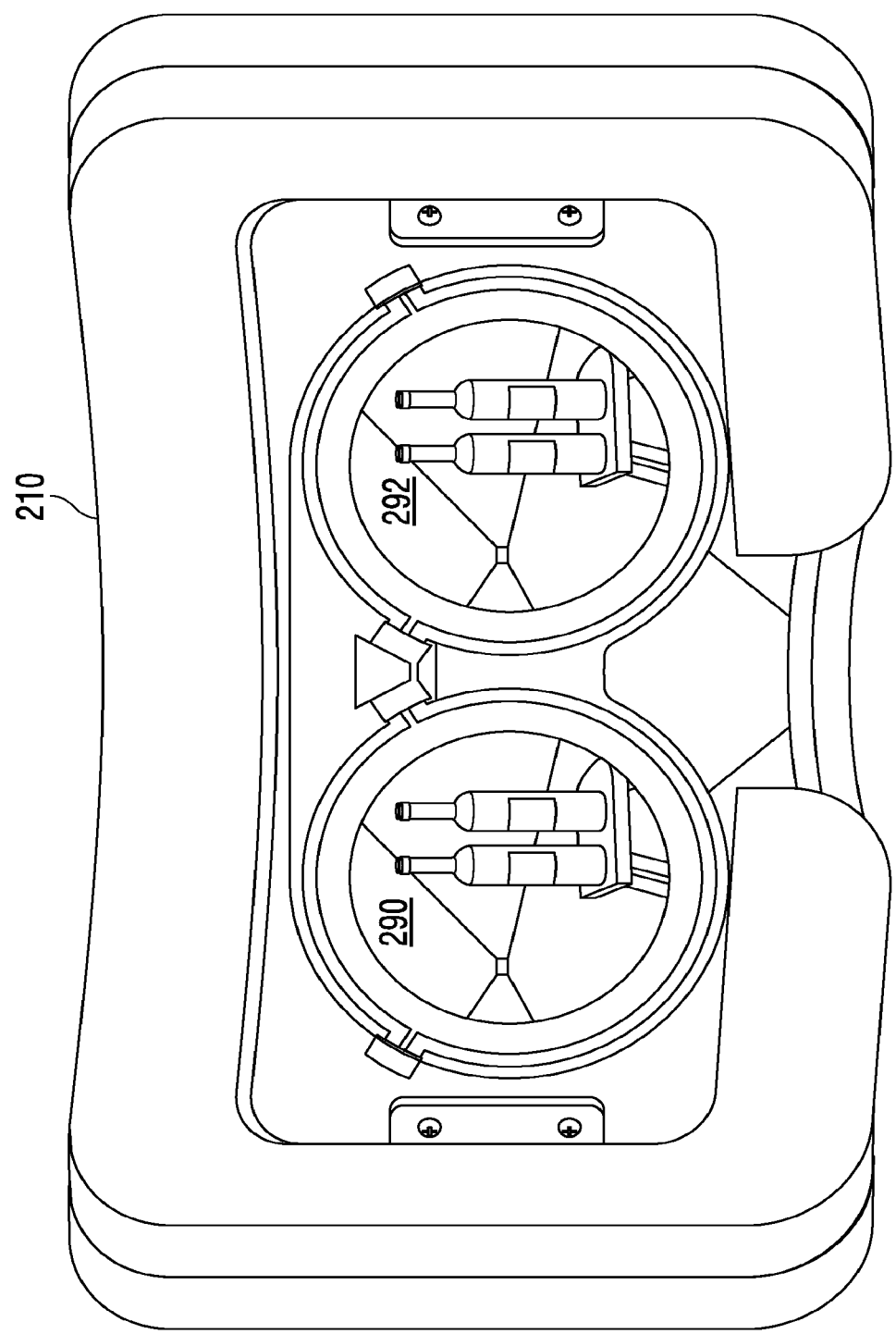
FIG. 15 depicts how the immersive digital environment of FIG. 13 may appear through the viewing lenses of a head mounted display.
Figure 16:
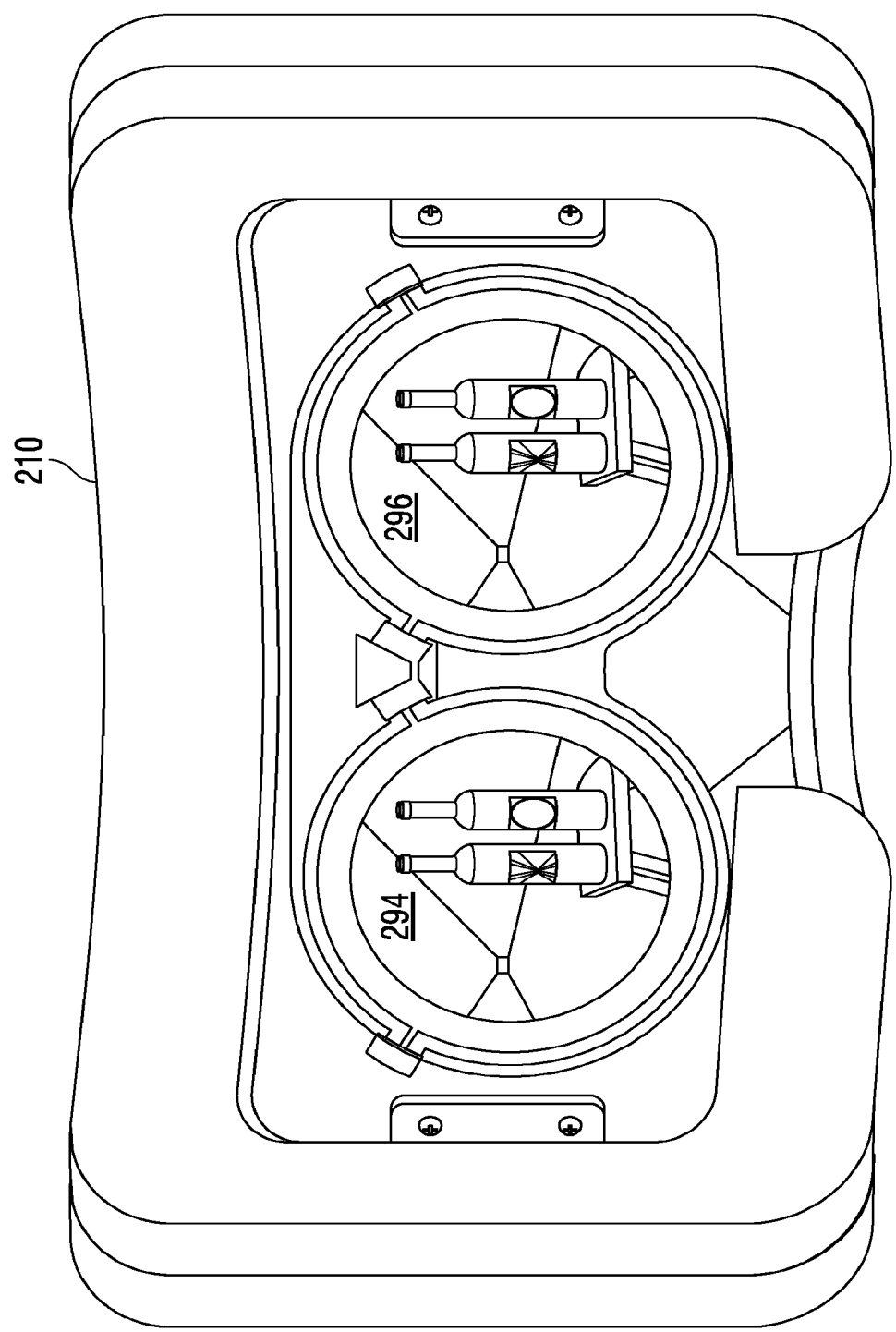
FIG. 16 depicts how the immersive digital environment of FIG. 14 may appear through the viewing lenses of a head mounted display.

FIG. 13 further shows a different virtual reality environment 270 wherein application of the presently disclosed method and system may occur. In virtual reality environment 270 appear wine bottles 272 and 274 resting upon wooden stool 276. Next, in FIG. 14 appear wine bottles with label 278 appearing on wine bottle 272 and label 280 on wine bottle 274. FIG. 15 depicts how the immersive digital environment of FIG. 13 may appear through the viewing lenses of HMD 210 for form scenes 290 and 292, while FIG. 16 depicts how the immersive digital environment of FIG. 14 may appear through the viewing lenses of HMD 210 to form scenes 294 and 296.

Figure 17:
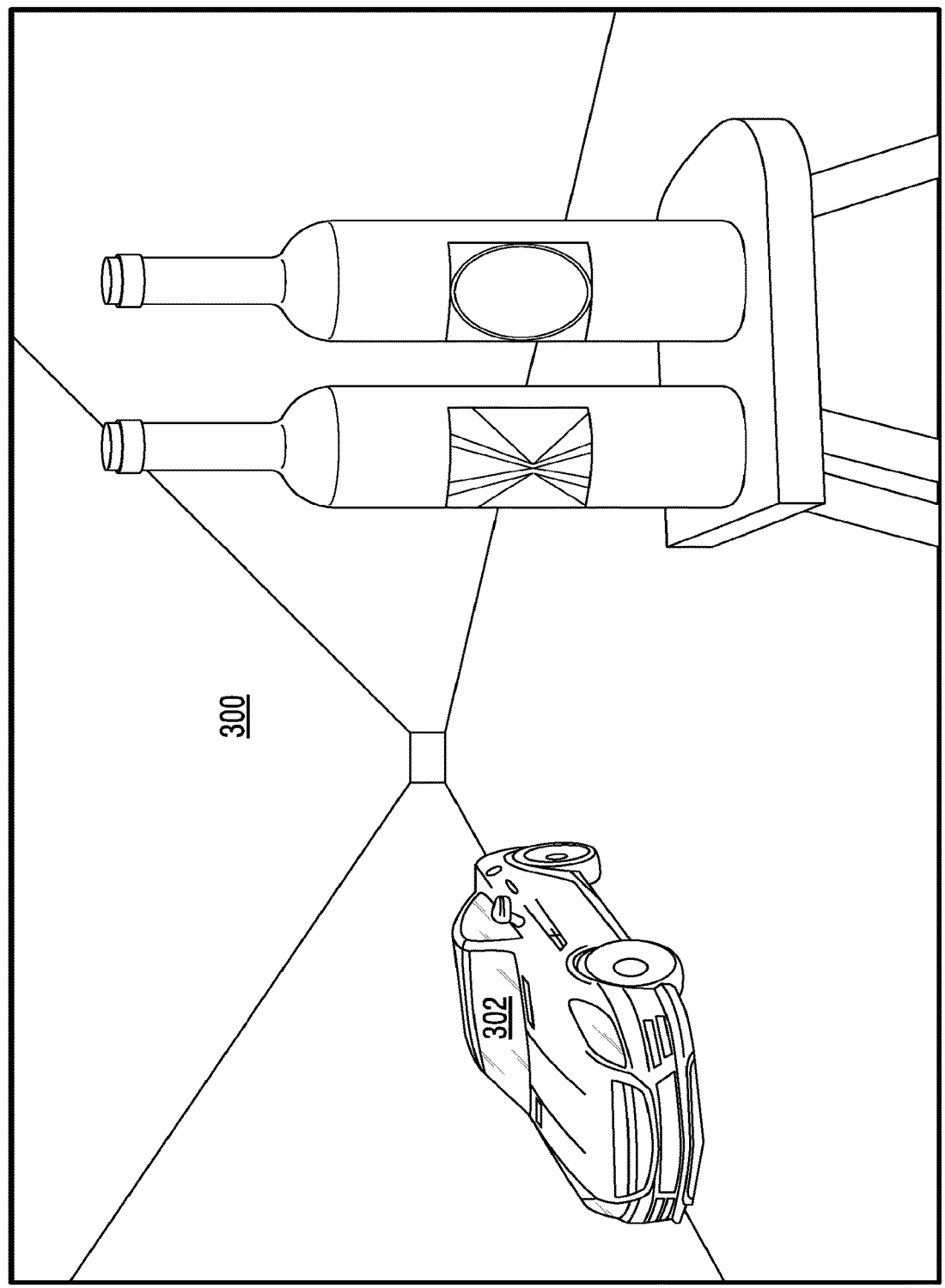
FIG. 17 yet further illustrates use of the presently disclosed teachings for further providing contextual advertising messaging via the presentation of an automobile within the background of a immersive digital environment.

FIG. 17 yet further illustrates use of the presently disclosed teachings for further providing contextual messaging via the presentation in the background of a immersive digital environment 300 an automobile 302, here a Mercedes Benz, beyond the original advertising locations of wine bottles 272 and 274.

In light of the above, the present disclosure provides immersive digital environment system 10 supporting enhanced advertising opportunities within a dramatically more sensory-rich environment. By providing contextual advertising in a virtual reality environment, the present disclosure provides a way to achieve what once seemed impossible. That is, the presently disclosed subject matter transports users to a different world. Although virtual reality, augmented reality, and similar technologies are in their infancy, at least one advertiser now have the opportunity to present their brand, objects, or messaging using a medium that's dramatically more impactful than ever before. This result is due to an enhanced ability to engage users' senses and immerse them completely into a virtual environment (which in fact, often doesn't feel "virtual" at all).

The method and system of the present disclosure provide that a brand, object, or message may be dynamically replaced as objects in software application 26 with advertising opportunities. Previously, any implementation of a system similar to the presently disclosed lacked the majority of the disclosed system's potential. In the past, when an advertising opportunity was forged between software developer and at least one advertiser, a meeting of the two was required meet and hash out all of the details, and the advertisement or brand message was hard-coded into the software application for that single advertiser. Prior opportunities were usually limited to something like a billboard that users could easily encounter without even noticing, similar to the phenomenon of "banner blindness" that we've all developed online and in real life. The method and system of the present disclosure allow software developer to register an item within their application for rent and copy a unique code from our system to replace the object in their application.

Then, advertiser may browse through a database of these opportunities to find the ones they're most interested in, upload a file that matches the measurements and other requirements for that object in the application (specified earlier by the developer), and "rent" that object without ever directly contacting the developer. The proposed system uses that unique code in the software application to communicate with our advertisement management system and dynamically replace objects available for rent with eligible advertisements from advertiser.

The presently disclosed method and system further provide the ability to allow users to interact with these dynamic advertisements. The virtual reality experience permits the user to walk right up to an advertised object and interact with it in whatever way the software developer programmed when creating their application. This implementation of advertising could be as subtle as the developer and advertiser prefer, but in many instances, it could be impossible to disregard or overlook. The developer may have this object associated with receiving resources within their application such as health or money, or it could be necessary to interact with the object to progress in the game or application. Gone are the days of developer and advertiser having to collaborate for weeks or months to create a modestly effective advertising opportunity, at best.

The presently disclosed method and system provide abilities to create novel, enhanced advertising opportunities for brands and advertiser without intrusion-dependent ads. Presently, most content is monetized or supplemented by intrusive forms of advertising that users have evolved to filter out. Whether it's television, radio, video games, or software—users have become mostly immune to advertisers' messages. This is largely due to the unharmonious integration of content and advertising. In known systems, content and advertising frequently compete against one another, rather than complement each other via a symbiotic integration. As long as these "branded objects" are integrated into software thoughtfully and harmoniously, the present disclosure permits advertiser to finally achieve a connection with their target audience independent from intrusion or competing with the content they're advertising within. The present method and system permit potentially lowering the barrier for advertiser to achieve a meaningful connection with consumers.

The presently disclosed method and system have the ability to discern that a particular advertisement might be appropriately placed in a particular VR environment. For example, in the event that a health kit appeared in a medicine chest appeared in a particular scene, the system would have the ability to provide branded bandages or other kinds of medicines within the medicine chest. Thus, given a particular size, particular location and other parameters that might be of importance to determine that a particular brand of medication and medicine might be applied to a particular scene, the system would have the ability to automatically populate such a presentation.

Another way to understand the dynamic advertising function of the present disclosure is to consider the method and systems as being able to "swap out" a non-branded object with a branded object. So, it would be possible to specify size and other characteristic to have a particular object that might fit for a given immersive digital environment. Such a object could be swapped out and made part of the scene by the system according to the particular way in which a virtual reality participant might interact with the scene.

On the other hand, by specifying a particular range of data, or a range of objects and other characteristics, the system would have the ability to simply determine whether or not particular object replacement would fit within those parameters. If so, the system would simply place the object within the scene without any type of artificial intelligence or other adaptation in order to make this work. So, if the system defines an object as, for example, a small food item or a drink, given whatever may be in the library off of objects that are candidates for swapping out, the system could simply place the appropriate advertisement in that scenario given the library or inventory of objects with which a software developer in advertiser may populate the system.

The scientifically-proven heightened state of emotion that VR, AR, and similar technologies can produce results in better advertising opportunities, which this system is designed to facilitate and capitalize on. Researchers have performed studies to see what effect video games and other entertainment media has on users. Video games in particular often create a heightened state of emotion that, unbeknownst to the user, makes them more receptive to branded messages, as described below. This research also shows that users are more likely to have an affinity toward an advertiser when encountered at the right moment during this heightened emotional state.

In understanding the power of the present disclosure to apply VR, AR, and similar technologies for advertising use, reference is made to the text entitled "*Contextual Advertising in Games: Impacts of Game Context on A Player's Memory and Evaluation of Brands in Video Games*," by Seung-Chul Yooa of the School of Communication & Media, Ewha Womans University, Republic of Korea, and Matthew Eastin of the Stan Richards School of Advertising & Public Relations, University of Texas at Austin, USA, (the "Eastin Study"), which is here expressly incorporated by reference in its entirety.

The Eastin Study makes clear that context-aware technology is one of the greatest contributions to the world of advertisement, and contextual advertising is a form of digital advertising that involves placing advertisements for display among relevant contents. Context-aware technology enables targeted advertising in games that takes advantage of atmospheric conditions and specific game contexts, and can be used for in-game advertising. Today's game developers seek ways to incorporate contextual advertising without interrupting players' natural gaming experience.

As a recent example, MediaBrix has created an innovative contextual in-game advertising platform that introduces ways to develop the best coherence between game playing and contextual advertisements. In particular, MediaBrix' contextual in-game advertising achieves its goal by timely placements of advertisements based on the company's study of the storyboard of a game.

The present disclosure takes it vantage of the significantly more intimate reaction that the user may have with an object in a virtual reality world. One particularly valuable example of the benefits from the intense experience that virtual reality provides relative to other forms of advertising occurs in the area of what is known as "advergames." An advergame may be considered to be a game involving video advertising. What is understood in the context of advergames is that when violence and other graphically intense situations occur, the emotions associated with a particular perception also increase, or become more intense. Thus, in the midst of a video altercation or road race or other type of footage a heightened awareness of a brand may occur. With the various sensations that may rise in an elevated state in the virtual reality environment, there is the possibility and probability of providing advertisements capable of resulting in a considerably greater impact than otherwise might be the case.

Another example could be in the context of a video reality came where the user might be bleeding or otherwise suffering some profound injury. As a result of his experience it, the user may open up a first aid kit or some other medical resource. In so doing, the user may see a branded bandage or some other health care object. As a result, the user would establish an emotionally intense affinity for that particular brand. These heightened experiences in a virtual reality environment truly present incredible advertising opportunities for brands.

The present disclosure, therefore, demonstrates the technical advantages of using factors underlying the effectiveness of advertisements in relation to a game's context. The Eastin Study reports and the present disclosure embodies a method and system whereby advertiser can strategically use game contexts to meet their advertising goals, and it revealed a number of interesting insights. By virtue of the present disclosure advertiser may make the best use of video games by strategically locating their advertisements in the contexts that will maximize advertising effectiveness.

The subject matter of the present disclosure provides the ability to bill on a novel, per-interaction basis (drinking, touching, eating, driving, turning on/off, listening to, etc.). The present method and system allow for an entirely new depth of interaction, while still providing all of the valuable data that advertiser use to direct digital media efforts. Users may "virtually" drink, touch, eat, drive, listen to, or otherwise interact with an advertiser's object or message. Users may even physically engage extra senses such as touch and smell in the in alternative embodiments of the present disclosure.

The presently disclosed system enables billing explicitly for each of virtual reality object interaction or engagement/ transaction. Accordingly, advertiser employing the present method and system may accurately measure value every time a charge occurs for a transaction. Even if the present system bills on a per-impression basis (typically billed per 1,000 impressions, or CPM), the value of these impressions are dramatically higher, in recognition of improved experience of the present disclosure.

The system and method not only enable advertiser to capitalize on the enhanced opportunities in virtual reality environment, but also enables software developers to monetize their content in an entirely new way, all while maintaining a large degree of control. Thus, not only advertiser, but also software developers benefit from the functions and features of the presently disclosed subject matter. The present system allows software developers to select carefully where they place advertising opportunities throughout their content, producing a highly effective monetization opportunity without sacrificing user experience. Accordingly, the presently disclosed method and system create an unprecedented amount of control, and an ability to completely preserve the developer's intended user experience while still making money through advertising.

In summary, the present disclosure provides a method and system for advertising dynamic content in an immersive digital medium user experience. The present method and system operate a plurality of computer processors and databases in an associated network for receiving, processing, and communicate instructions and data relating to advertising content in an immersive digital medium user experience. The method and system execute instructions and processing data relating to advertising objects, the advertising objects comprising images of objects, signs, labels, and related indicia of object origin for indicating sources of purchasing one or more objects for advertising. The method and system receive advertising instructions and data from a plurality of software applications for directing the use of said images for objects, signs, labels, and related indicia of object origin with said immersive digital medium user experience. The method and system respond to variations in said advertising instructions and data whereby operation of said computer processors and databases enables swapping out of various advertising messages and images according to the context of said immersive digital medium user experience.

Another aspect, based on the engagement of the user, includes the ability to automatically increase the price of a particular advertising object. This may dynamically reflect the demand of the particular advertising object and provide data of particular importance to advertiser. This could include changes and rental place prices for the particular advertising space as well as the direction during which an advertisement object could be displayed within the environment. Also, the higher number of times for a particular appetizing object may arise based on the interaction between users and the advertising object may enable an advertise to capitalize on prime advertising opportunities.

Comprehensively, the presently disclosed subject matter operates seamlessly to provide advertising content without disturbing the immersive experience that is paramount to virtual reality's prosperity, adoption, and overall success. Accordingly, within a virtual reality environment, the present disclosure essentially eliminates intrusive ads day-in and day-out for those users of immersive digital systems.

All references, including publications, patent applications, and patents, cited herein are hereby incorporated by reference to the same extent as if each reference were individually and specifically indicated to be incorporated by reference and were set forth in its entirety herein.

The methods, systems, process flows and logic of disclosed subject matter associated with a computer readable medium may be described in the general context of computer-executable instructions, such as, for example, program modules, which may be executed by a computer. Generally, program modules may include routines, programs, objects, components, data structures, etc. that perform particular tasks or implement particular abstract data types. The disclosed subject matter may also be practiced in distributed computing environments wherein tasks are performed by remote processing devices that are linked through a communications network. In a distributed computing environment, program modules may be located in local and/or remote computer storage media including memory storage devices.

The detailed description set forth herein in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments.

This detailed description of illustrative embodiments includes specific details for providing a thorough understanding of the presently disclosed subject matter. However, it will be apparent to those skilled in the art that the presently disclosed subject matter may be practiced without these specific details. In some instances, well-known structures and devices are shown in block diagram form in order to avoid obscuring the concepts of the presently disclosed method and system.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein, but is to be accorded the widest scope consistent with the principles and novel features disclosed herein. It is contemplated that additional embodiments are within the spirit and true scope of the disclosed subject matter.

What is claimed is:

1. In an immersive digital medium environment, a method for providing dynamic digital advertising content, comprising the steps of:
providing a digital communications network for communicating digital data and executable instructions for use in forming said immersive digital medium environment, said immersive digital medium environment performing the steps of:
communicating between said digital communications network and an advertising information database of digital data and executable instructions comprising a list of advertising opportunities describing one or more advertising locations within said immersive digital medium environment, and digital data relating to display eligibility for each advertising opportunity of the list of the advertising opportunities, wherein the list of advertising opportunities is updated by a dynamic digital content developer;

communicating between said digital communications network and at least one advertiser communication circuit for receiving a plurality of dynamic digital advertising requests communicated digitally from at least one advertiser and further communicating and storing said dynamic digital advertising requests within said advertising information database for subsequent use by an advertising management engine;

communicating between said digital communications network and an advertisement storage server, said advertisement storage server providing digital data storage memory circuitry and digital processor circuitry for executing instructions relating to use of at least one of digital image data and executable instructions, video data and executable instructions, audio data and executable instructions, and texture data and executable instructions for use by said advertisement management engine in generating said dynamic digital advertisements for use in said immersive digital medium environment;

communicating between said digital communications network and said advertisement management engine, said advertising management engine in digital communication with said advertising information database and comprising a computer processor for processing digital data and executable instructions for generating eligibility for a dynamic digital advertising content to be used for an advertising opportunity of the list of advertising opportunities in said immersive digital medium environment based on a combination of factors comprising a predetermined set of advertising preferences, dynamic conditions in said immersive digital medium environment, and said display eligibility for the advertising opportunity; and dynamically generating a digital advertising content to fill said advertising opportunity using at least one of said digital image data and executable instructions, video data and executable instructions, audio data and executable instructions, and texture data and executable instructions based on said determination of eligibility and said dynamic digital advertising requests; and communicating between said digital communications network and a plurality of immersive digital medium environment user devices, each of said immersive digital medium environment user devices comprising at least one memory circuit and computer processor for receiving and storing digital data and executable instructions for use in one display software application for presenting the immersive digital medium environment containing said digital advertising content along with associated sensation to a wearer of one of said immersive digital medium environment user devices for sensing said digital advertising content within said immersive digital medium environment.

2. The method of claim 1, further comprising the step of providing the at least one advertiser the ability to dynamically deliver interactive and contextual advertisements for use in said immersive digital medium environment.

3. The method of claim 1, further comprising the steps of dynamically replacing objects in a virtual reality application of said immersive digital medium environment.

4. The method of claim 1, further comprising the steps of dynamically replacing objects in an augmented reality application of said immersive digital medium environment.

5. The method of claim 1, further comprising the steps of providing wearer controls for use in said immersive digital environment whereby a wearer may interact with digital advertising content.

6. The method of claim 1, further comprising the steps of delivering transaction-based or advertising content to electronic media users without disturbing the immersive experience that is paramount to this technology's prosperity, adoption, and overall success.

7. The method of claim 1, further comprising the steps of using a scientifically proven heightened state of emotion that virtual reality, augmented reality, and similar technologies can produce.

8. The method of claim 1, further comprising
communicating between said digital communication network and a digital administrative system comprising memory and processor circuitry for storing digital data and executing processor instructions relating to administrative operations relating to said dynamic digital advertising content,
said digital administrative system further communicating dynamic digital advertising content data and executable instructions with said at least one advertiser communication circuits and further communicating said digital data and executable instructions to said advertising information database for storage and further use by said advertising management engine;
said digital administrative system further communicating digital data and executable instructions with the software developer communications circuitry for communicating information relating to said dynamic digital advertising content to said dynamic digital content developer.

* * * * *